(12) United States Patent
Uehara et al.

(10) Patent No.: US 10,108,839 B2
(45) Date of Patent: Oct. 23, 2018

(54) DISPLAY DEVICE

(71) Applicant: Japan Display Inc., Tokyo (JP)

(72) Inventors: Toshinori Uehara, Tokyo (JP);
Yoshitoshi Kida, Tokyo (JP); Hiroshi Mizuhashi, Tokyo (JP); Hayato Kurasawa, Tokyo (JP); Yuji Suzuki, Tokyo (JP); Shoji Hinata, Tokyo (JP); Toshiya Yamazaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/605,598

(22) Filed: May 25, 2017

(65) Prior Publication Data
US 2017/0372110 A1 Dec. 28, 2017

(30) Foreign Application Priority Data
Jun. 27, 2016 (JP) ................. 2016-126890

(51) Int. Cl.
*G06K 9/00* (2006.01)
*G06F 3/041* (2006.01)
(Continued)

(52) U.S. Cl.
CPC ....... *G06K 9/0002* (2013.01); *G06F 3/03547* (2013.01); *G06F 3/041* (2013.01);
(Continued)

(58) Field of Classification Search
CPC ............. G06K 9/0002; G06K 9/00013; G06K 9/0004; G06K 7/10722; G06K 9/00107;
(Continued)

(56) References Cited

U.S. PATENT DOCUMENTS 6,327,376 B1* 12/2001 Harkin ................. G01B 7/004
356/71
6,401,551 B1 6/2002 Kawahara et al.
(Continued)

FOREIGN PATENT DOCUMENTS

JP 2001-046359 A 2/2001
JP 2001-052148 A 2/2001
(Continued)

*Primary Examiner* — Manav Seth
(74) *Attorney, Agent, or Firm* — Michael Best & Friedrich LLP

(57) ABSTRACT

A display panel including a display function layer displaying an image in a display area, a cover member including a first face and a second face disposed on an opposite side of the first face and faces the display panel, and a fingerprint sensor including a plurality of first detection electrodes disposed in a sensor base and configured to detect unevenness of an object brought into contact with or approaching the first face of the cover member, a shield electrode disposed to face the plurality of first detection electrodes and configured to suppress a change in capacitance between the first detection electrodes and the shield electrode, and switching elements disposed in correspondence with the first detection electrodes, the fingerprint sensor being arranged between the cover member and the display panel and arranged to overlap with the display area when viewed in a direction perpendicular to the first face are included.

17 Claims, 27 Drawing Sheets

(51) Int. Cl.
*G06F 21/32* (2013.01)
*G06F 3/044* (2006.01)
*G06F 3/0354* (2013.01)

(52) U.S. Cl.
CPC .............. *G06F 3/044* (2013.01); *G06F 21/32* (2013.01); *G06F 2203/0338* (2013.01)

(58) Field of Classification Search
CPC ....... G06K 9/209; G06F 3/044; G06F 3/0416; G06F 3/0412; G06F 21/32; G06F 3/041; G06F 3/03547; G06F 2203/04111; G06F 2203/0338; G06F 3/0488; G02F 1/134309; G02F 1/1343
See application file for complete search history.

(56) References Cited

U.S. PATENT DOCUMENTS

| | | | |
|---|---|---|---|
| 6,462,563 B1 | 10/2002 | Kawahara et al. | |
| 6,980,008 B2 * | 12/2005 | Teranuma | G06K 9/0002 324/663 |
| 8,599,150 B2 * | 12/2013 | Philipp | G06F 3/044 178/18.01 |
| 8,724,038 B2 * | 5/2014 | Ganapathi | G02B 26/0833 345/173 |
| 9,652,603 B1 * | 5/2017 | Lin | G06F 21/32 |
| 9,679,182 B2 * | 6/2017 | Bae | G06K 9/00013 |
| 9,773,148 B2 * | 9/2017 | Mo | G06K 9/0002 |
| 2011/0102567 A1 * | 5/2011 | Erhart | G06K 9/00026 348/77 |
| 2011/0273394 A1 * | 11/2011 | Young | G06F 3/047 345/174 |
| 2012/0092293 A1 | 4/2012 | Ganapathi et al. | |
| 2012/0242635 A1 * | 9/2012 | Erhart | G06F 1/1626 345/207 |
| 2013/0287274 A1 * | 10/2013 | Shi | G06F 3/044 382/124 |
| 2014/0104228 A1 * | 4/2014 | Chen | G06F 3/044 345/174 |
| 2014/0333328 A1 | 11/2014 | Nelson et al. | |
| 2015/0116263 A1 * | 4/2015 | Kim | G06F 3/044 345/174 |
| 2015/0177884 A1 * | 6/2015 | Han | G06F 3/044 345/174 |
| 2015/0242673 A1 * | 8/2015 | Singhal | G06K 9/00013 345/174 |
| 2016/0357330 A1 * | 12/2016 | Park | G06F 3/0412 |
| 2016/0364593 A1 * | 12/2016 | Lee | G06F 3/0416 |
| 2017/0068365 A1 * | 3/2017 | Liu | G06F 3/0412 |
| 2017/0270342 A1 * | 9/2017 | He | G06F 3/0412 |
| 2018/0129798 A1 * | 5/2018 | He | G06F 21/32 |

FOREIGN PATENT DOCUMENTS

| | | |
|---|---|---|
| JP | 2013-541780 A | 11/2013 |
| JP | 2015-201164 A | 11/2015 |

\* cited by examiner

DISPLAY DEVICE

CROSS-REFERENCE TO RELATED APPLICATIONS

This application claims priority from Japanese Application No. 2016-126890, filed on Jun. 27, 2016, the contents of which are incorporated by reference herein in its entirety.

BACKGROUND

1. Technical Field

The present disclosure relates to a display device.

2. Description of the Related Art

In a display device including a liquid crystal panel or the like, there are cases where a fingerprint sensor is arranged. The fingerprint sensor detects the shape of a fingerprint of a finger that is brought into contact with a display device by detecting a change in capacitance according to unevenness of the fingerprint (for example, Japanese Patent Application Laid-open Publication No. 2001-52148 (JP-A-2001-52148)). A result of the detection acquired by the fingerprint sensor, for example, is used for personal authentication or the like. On the surface of the fingerprint sensor, cover glass configured to protect the liquid crystal panel or the like is disposed, and a fingerprint can be detected using the fingerprint sensor by causing a finger to be brought into contact with or approach the surface of the cover glass.

In a case where a fingerprint sensor is arranged in a display area of a liquid crystal panel, cover glass is arranged between the fingerprint sensor and a finger. For this reason, there are cases where it is difficult to acquire sufficient detection sensitivity due to an increase in the distance between the finger and the fingerprint sensor. In a fingerprint reader disclosed in JP-A-2001-52148, a detection electrode configured to detect a fingerprint is integrally arranged with a liquid crystal panel. For this reason, in a case where cover glass is disposed on the liquid crystal panel, there are cases where the detection capability is degraded due to an increase in the distance between the surface of the cover glass and the detection electrode.

SUMMARY

A display device includes a display panel that includes a display function layer displaying an image in a display area, a cover member that includes a first face and a second face disposed on an opposite side of the first face and faces the display panel, and a fingerprint sensor that includes a plurality of first detection electrodes disposed in a sensor base and configured to detect unevenness of an object brought into contact with or approaching the first face of the cover member, a shield electrode disposed to face the plurality of first detection electrodes and configured to suppress a change in capacitance between the first detection electrodes and the shield electrode, and switching elements disposed in correspondence with the first detection electrodes, the fingerprint sensor being arranged between the cover member and the display panel and arranged to overlap with the display area when viewed in a direction perpendicular to the first face.

DETAILED DESCRIPTION

Figure 1:
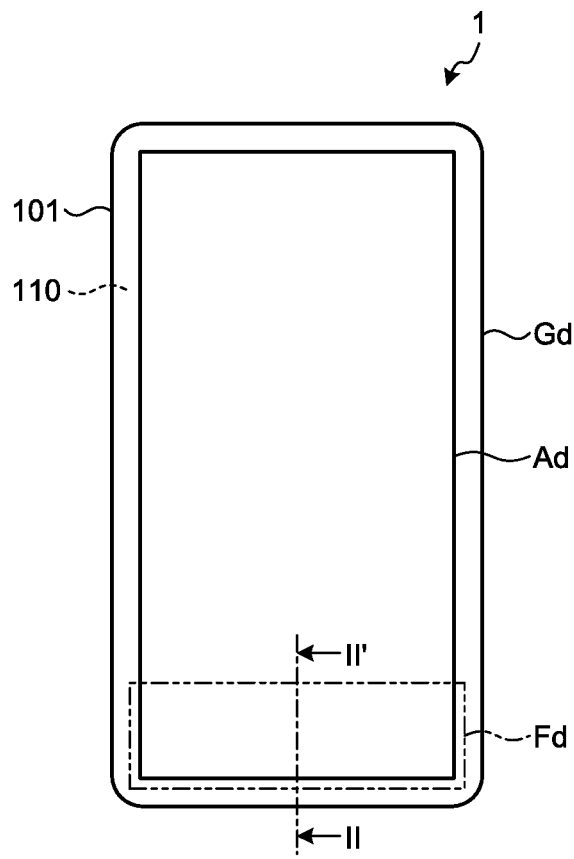
FIG. 1 is a plan view of a display device according to a first embodiment.

Hereinafter, embodiments of the present invention will be described in detail with reference to the drawings. However, the present invention is not limited to contents described in the embodiments described below. In each constituent element described below, an element that can be easily considered by a person skilled in the art or an element that is substantially the same as the constituent element are included. In addition, constituent elements described below can be appropriately combined. Furthermore, the disclosure is merely an example, and it is apparent that an appropriate change that can be acquired by a person skilled in the art with the main concept of the present invention being maintained belongs to the scope of the present invention. In addition, while the drawing is for further clarification of the description, and there are cases where the width, the thickness, the shape, and the like of each component are illustrated more schematically than those of an actual form, these are merely an example, and the interpretation of the present invention is not limited thereto. Furthermore, in the present specification and each diagram, a same reference numeral is assigned to each element similar to that described in a former diagram, and detailed description thereof may not be presented as is appropriate.

First Embodiment

Figure 2:
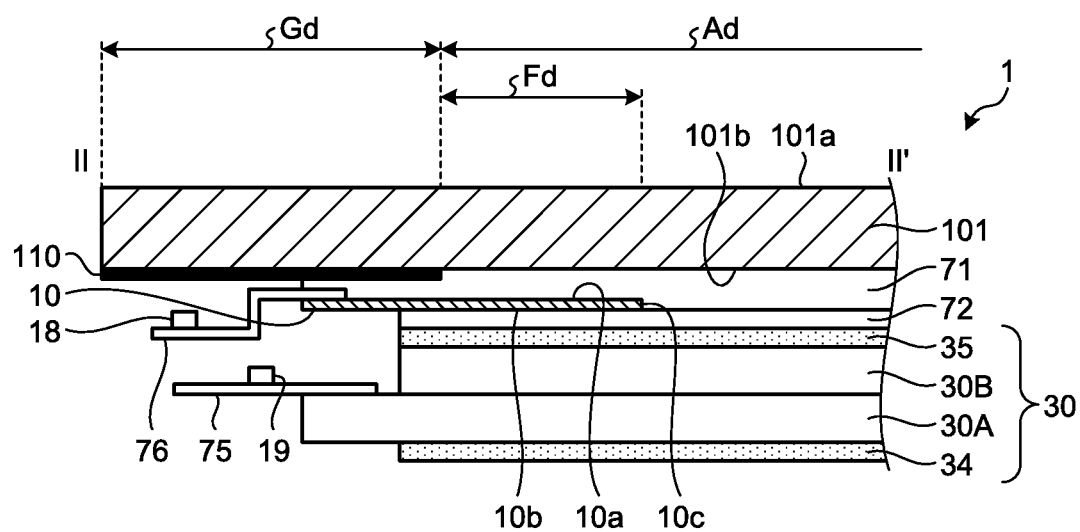
FIG. 2 is a cross-sectional view taken along line II-II' illustrated in FIG. 1.

FIG. 1 is a plan view of a display device according to a first embodiment. FIG. 2 is a cross-sectional view taken along line II-II' illustrated in FIG. 1. As illustrated in FIG. 1, a display device 1 according to this embodiment includes a display area Ad configured to display an image, a frame area Gd that is disposed outside the display area Ad, and a fingerprint detection area Fd that overlaps with a part of the display area Ad. In this embodiment, the fingerprint detection area Fd is a rectangular area disposed along a short side of the display area Ad and is an area configured to detect unevenness of the surface of a finger or the like being brought into contact with or approaching a cover member 101.

As illustrated in FIG. 2, the display device 1 according to this embodiment includes the cover member 101, a fingerprint sensor 10, and a display panel 30. The cover member 101 is a plate-shaped member including a first face 101a and a second face 101b disposed on a side opposite to the first face 101a. The first face 101a of the cover member 101 is a detection face configured to detect unevenness of the surface of a contacting or approaching finger or the like and is a display face used by an observer for visually recognizing an image displayed on the display panel 30 that is transmitted through the display area Ad. On the second face 101b side of the cover member 101, the fingerprint sensor 10 and the display panel 30 are disposed. The cover member 101 is a member configured to protect the fingerprint sensor 10 and the display panel 30 and is disposed to cover the fingerprint sensor 10 and the display panel 30. The cover member 101, for example, is a glass substrate or a resin substrate.

The configuration is not limited to a case where both the cover member 101 and the display panel 30 have a rectangular shape in a planar view, but the cover member 101 and the display panel 30 may be configured to have a circular shape, an oval shape, or a different shape acquired by eliminating a part of such an external shape. In addition, the external shapes of the cover member 101 and the display panel 30 may be different from each other like a case where the cover member 101 has a circular shape, and the display panel 30 has a regular polygon shape or the like. The cover member 101 is not limited to a planar shape, but, a curved-face display having a curved face may be employed, for example, in which the display area Ad is configured by a curved face, or the frame area Gd is curved to the display panel 30 side.

As illustrated in FIGS. 1 and 2, in the frame area Gd, a decoration layer 110 is disposed on the second face 101b of the cover member 101. The decoration layer 110 is a colored layer having light transmittance lower than the cover member 101 and can suppress wirings, circuits, and the like disposed to overlap with the frame area Gd from being visually recognized by an observer. In the example illustrated in FIG. 2, while the decoration layer 110 is disposed on the second face 101b, the decoration layer 110 may be disposed on the first face 101a. In addition, the decoration layer 110 is not limited to a single layer but may have a configuration in which a plurality of layers are superimposed.

The fingerprint sensor 10 is a detector that is configured to detect unevenness of the surface of a finger or the like being brought into contact with or approaching the first face 101a of the cover member 101. As illustrated in FIG. 2, the fingerprint sensor 10 is disposed between the cover member 101 and the display panel 30 and overlaps with the fingerprint detection area Fd and a part of the frame area Gd when viewed from a direction perpendicular to the first face 101a. A flexible substrate 76 is coupled to the fingerprint sensor 10 in the frame area Gd, and a detection IC 18 configured to control the detection operation of the fingerprint sensor 10 is mounted in the flexible substrate 76.

One face 10a of the fingerprint sensor 10 is bonded to the second face 101b of the cover member 101 via an adhesive layer 71. The other face 10b is bonded to a polarizing plate 35 of the display panel 30 via an adhesive layer 72. A side face 10c of the fingerprint sensor 10 is disposed at a position overlapping with the display area Ad. By using a liquid adhesive agent having a light transmitting property for the adhesive layer 71 and the adhesive layer 72, the one face 10a of the fingerprint sensor 10, the other face 10b, and the side face 10c are brought into close contact with the adhesive layer 71 and the adhesive layer 72 and are in the state of being buried inside a resin layer. For this reason, it can be suppressed that air bubbles are generated between the adhesive layer 71 and the fingerprint sensor 10, and between the adhesive layer 72 and the fingerprint sensor 10. In FIG. 2 and the like, while the adhesive layer 71 and the adhesive layer 72 are illustrated to be divided into layers, in a case where a same material is used for the adhesive layer 71 and the adhesive layer 72, the adhesive layer 71 and the adhesive layer 72 are integrated together to have a configuration of which a boundary is not visually recognized. In other words, the fingerprint sensor 10 may be configured to be buried inside the resin layer of one layer.

Figure 3:
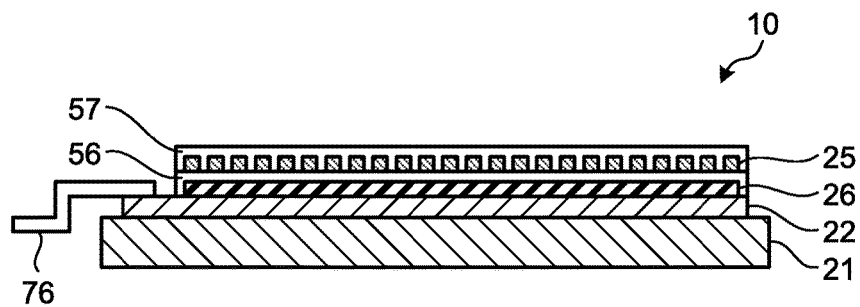
FIG. 3 is a cross-sectional view that illustrates a schematic cross-section structure of a fingerprint sensor.

FIG. 3 is a cross-sectional view that illustrates a schematic cross-section structure of the fingerprint sensor. As illustrated in FIG. 3, the fingerprint sensor 10 includes a sensor base 21, a wiring layer 22, a first detection electrode 25, and a shield electrode 26. The sensor base 21 is a film-shaped base of a polyimide resin or the like. Alternatively, the sensor base 21 may be a glass substrate.

The wiring layer 22 is disposed on the sensor base 21 and includes various wirings such as a first switching element Tr, a gate line GCL, and a signal line SGL. The first detection electrode 25 is disposed on the upper side of the wiring layer 22. The first detection electrode 25 is a detection electrode of the fingerprint sensor 10 and outputs a detection signal Vdet corresponding to a change in capacitance according to the unevenness of the surface of a contacting or approaching finger. The detection signal Vdet output from the first detection electrode 25 is output to the detection IC 18 mounted on the flexible substrate 76 through the wiring layer 22. The shield electrode 26 is disposed between the first detection electrode 25 and the wiring layer 22. The shield electrode 26 is a shield electrode of the first detection electrode 25 and suppresses influences of a change in capacitance due to the presence of an external object such as a finger, an electromagnetic noise, and the like on the first detection electrode 25 on a side opposite to the cover member 101.

An insulating layer 56 is disposed between the shield electrode 26 and the first detection electrode 25. In addition, on the first detection electrode 25, an insulating layer 57 is disposed. The insulating layer 57 is in contact with the adhesive layer 71 illustrated in FIG. 2, and the fingerprint sensor 10 is bonded to the cover member 101. In other words, from the side of the first face 101a that is a detection face of the cover member 101, the first detection electrode 25, the shield electrode 26, the wiring layer 22, and the sensor base 21 are stacked in the mentioned order.

As the material of the first detection electrode 25 and the shield electrode 26, a conductive material having a light transmitting property such as indium tin oxide (ITO) may be used. In addition, as the material of the sensor base 21, a material having a light transmitting property is used. The fingerprint sensor 10 is a sensor having a light transmitting property and can suppress degradation of the image quality of an image displayed on the display panel 30 even in a case where the fingerprint sensor 10 is disposed in a part of or the whole display area Ad.

As illustrated in FIG. 2, the display panel 30 includes a pixel substrate 30A, a counter substrate 30B, a polarizing plate 34 disposed on the lower side of the pixel substrate 30A, and a polarizing plate 35 disposed on the upper side of the counter substrate 30B. A display IC 19 configured to control the display operation of the display panel 30 is coupled to the pixel substrate 30A through the flexible substrate 75. In this embodiment, the display panel 30 is a liquid crystal panel in which liquid crystal display elements are used as a display function layer. The display panel 30 is not limited thereto but, for example, may be an organic EL display panel. The detection IC 18 and the display IC 19 may be included in a control substrate disposed outside the module. Alternatively, it may be configured such that the detection IC 18 is included in the sensor base 21 of the fingerprint sensor 10, and the display IC 19 is included in a first substrate 31 (see FIG. 4) of the pixel substrate 30A.

Figure 4:
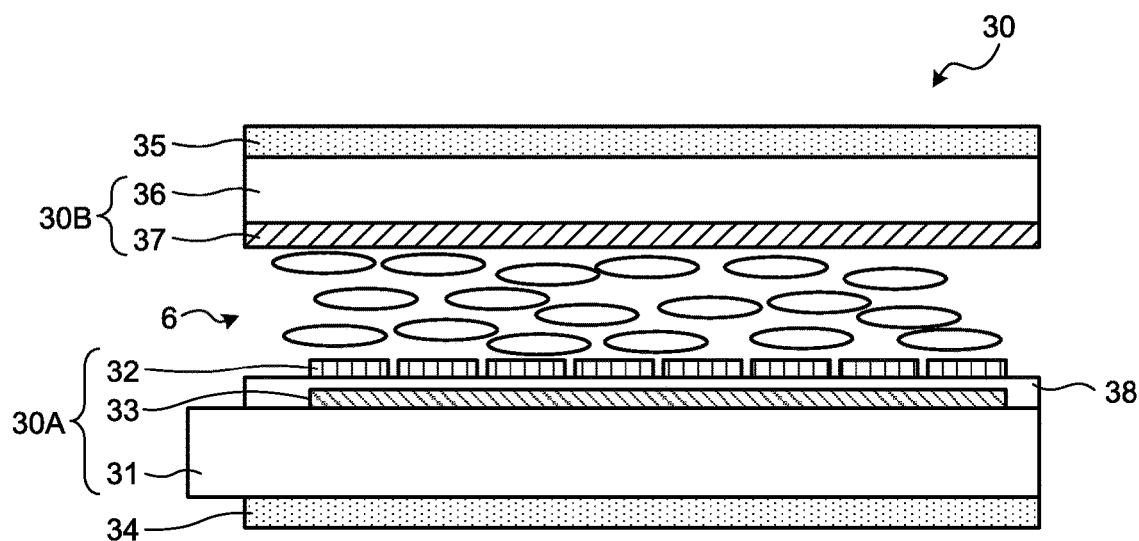
FIG. 4 is a cross-sectional view that illustrates a schematic cross-section structure of a display panel.

FIG. 4 is a cross-sectional view that illustrates a schematic cross-section structure of the display panel. The pixel substrate 30A includes a first substrate 31, pixel electrodes 32, and a common electrode 33. The common electrode 33 is disposed on the first substrate 31. A plurality of the pixel electrodes 32 are disposed above the upper side of the common electrode 33 via an insulating layer 38 and are arranged in a matrix pattern in the planar view. Each pixel electrode 32 is disposed in correspondence with a sub pixel configuring each pixel Pix of the display panel 30 and is supplied with a pixel signal configured to perform a display operation. In addition, the common electrode 33 is supplied with a DC drive signal for display and functions as a common electrode for the plurality of the pixel electrodes 32.

In this embodiment, on the first substrate 31, the common electrode 33, the insulating layer 38, and the pixel electrode 32 are stacked in the mentioned order. Below the lower side of the first substrate 31, a polarizing plate 34 is disposed via an adhesive layer. In the first substrate 31, thin film transistors (TFT) that are switching elements for display are arranged (not illustrated in FIG. 4). As the material of the pixel electrode 32 and the common electrode 33, a conductive material having a light transmitting property such as ITO is used.

In addition, the arrangement of the plurality of the pixel electrodes 32 may be configured not only as a matrix-pattern arrangement arranged along a first direction and a second direction orthogonal to the first direction but also as an arrangement in which pixel electrodes 32 adjacent to each other are arranged to deviate in a first direction or a second direction. Furthermore, a configuration may be employed in which, based on a difference between the sizes of pixel electrodes 32 adjacent to each other, for one pixel electrode 32 configuring a pixel column arranged in a first direction, a plurality of two or three pixel electrodes 32 are arranged on one side of the pixel electrode.

The counter substrate 30B includes a second substrate 36 and a color filter 37 formed on one face of the second substrate 36. The color filter 37 faces a liquid crystal layer 6 in a direction perpendicular to the first substrate 31. In addition, above the second substrate 36, a polarizing plate 35 is disposed via an adhesive layer. The color filter 37 may be arranged on the first substrate 31. In this embodiment, the first substrate 31 and the second substrate 36, for example, are glass substrates or resin substrates.

Between the first substrate 31 and the second substrate 36, a liquid crystal layer 6 is disposed. The liquid crystal layer 6 modulates light passing therethrough in accordance with the state of an electric field, and a liquid crystal of a horizontal electric field mode such as in-plane switching (IPS) including fringe field switching (FFS) is used. In addition, between the liquid crystal layer 6 and the pixel substrate 30A illustrated in FIG. 4 and between the liquid crystal layer 6 and the counter substrate 30B, orientation films may be arranged respectively.

On the lower side of the first substrate 31, a lighting circuitry (back light) not illustrated in the drawing is disposed. The lighting circuitry includes a light source such as an LED and emits light transmitted from the light source toward the first substrate 31. The light emitted from the lighting circuitry passes through the pixel substrate 30A, and, by switching between a non-emission portion blocking light and an emission portion based on the state of the liquid crystal at that position, an image is displayed on the display face (first face 101a).

As illustrated in FIG. 2, the display panel 30 is bonded to the fingerprint sensor 10 via the adhesive layer 72 disposed on the polarizing plate 35 in the fingerprint detection area Fd. In addition, in an area of the display area Ad that does not overlap with the fingerprint detection area Fd, the display panel 30 is bonded to the cover member 101 not via the fingerprint sensor 10 but via the adhesive layer 71 and the adhesive layer 72.

As illustrated in FIG. 2, the fingerprint sensor 10 is arranged at a position closer to the cover member 101 than to the display panel 30 in a direction perpendicular to the second face 101b of the cover member 101. By employing such a configuration, for example, a distance between the first detection electrode 25 that is a detection electrode and the first face 101a that is a detection face can be shorter than that of a case where a detection electrode for detecting a fingerprint is arranged integrally with the display panel 30. Therefore, according to the display device 1 of this embodiment, the detection performance can be improved.

Figure 5:
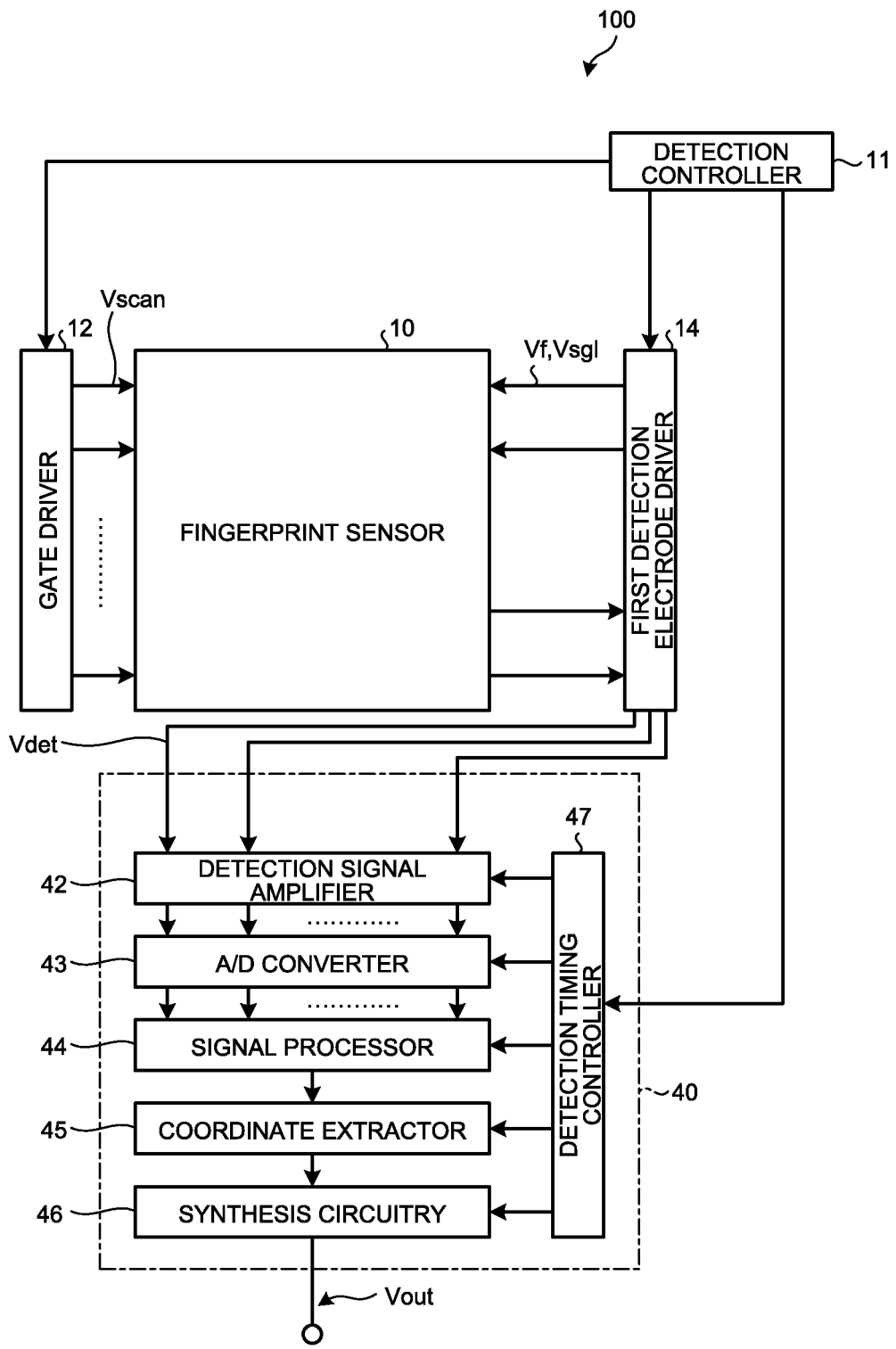
FIG. 5 is a block diagram that illustrates an example of the configuration of a fingerprint detecting device including a fingerprint sensor.

Next, a detailed configuration of the fingerprint sensor 10 will be described. FIG. 5 is a block diagram that illustrates an example of the configuration of a fingerprint detecting device including a fingerprint sensor. As illustrated in FIG. 5, the fingerprint detecting device 100 includes: a fingerprint sensor 10, a detection controller 11, a gate driver 12, a first detection electrode driver 14, and a detector 40.

The fingerprint sensor 10 performs detection by sequentially scanning detection lines one at each time in accordance with a scan signal Vscan supplied from the gate driver 12. The fingerprint sensor 10 detects unevenness of the surface of a contacting or approaching finger based on the detection principle of the self-capacitance type, thereby detecting the shape of the fingerprint.

The detection controller 11 is a circuit that respectively supplies control signals to the gate driver 12, the first detection electrode driver 14, and the detector 40 to perform control of these components to operate in synchronization with each other. The gate driver 12 sequentially selects first detection electrode blocks 25A each including a plurality of first detection electrodes 25 that are targets of the fingerprint sensor 10 for detection driving based on a control signal supplied from the detection controller 11. The first detection electrode driver 14 supplies a drive signal Vf to a first detection electrode 25 that is the target of the fingerprint sensor 10 for detection driving based on a control signal supplied from the detection controller 11.

The detector 40 is a circuit that detects presence/absence of a touch at a fine pitch based on a control signal supplied from the detection controller 11 and a detection signal Vdet supplied from the fingerprint sensor 10. The detector 40 includes a detection signal amplifier 42, an A/D converter 43, a signal processor 44, a coordinate extractor 45, a synthesis circuitry 46, and a detection timing controller 47. The detection timing controller 47 performs control based on a control signal supplied from the detection controller 11 such that the detection signal amplifier 42, the A/D converter 43, the signal processor 44, the coordinate extractor 45, and the synthesis circuitry 46 operate in synchronization with each other.

The detection signal Vdet is supplied from the fingerprint sensor 10 to the detection signal amplifier 42 of the detector 40. The detection signal amplifier 42 amplifies the detection signal Vdet. The A/D converter 43, at timing synchronized with a drive signal Vf, performs sampling of an analog signal output from the detection signal amplifier 42 and converts the analog signal into a digital signal.

The signal processor 44 is a logic circuit that detects presence/absence of a touch for the fingerprint sensor 10 based on an output signal of the A/D converter 43. The signal processor 44 performs a process of taking out a signal (absolute value $|\Delta V|$) of a difference of a detection signal according to a finger. The signal processor 44 compares the absolute value $|\Delta V|$ with a predetermined threshold voltage. In a case where the absolute value $|\Delta V|$ is less than the threshold voltage, the signal processor 44 determines that an approaching external object is in a non-contact state. On the other hand, in a case where the absolute value $|\Delta V|$ is the threshold voltage or more, the signal processor 44 determines that an approaching external object is in a contact state. In this way, the detector 40 can perform touch detection.

The coordinate extractor 45 is a logic circuit that acquires detection coordinates when a touch is detected by the signal processor 44. The coordinate extractor 45 outputs the detected coordinates to the synthesis circuitry 46. The synthesis circuitry 46 combines detection signals Vdet output from the fingerprint sensor 10, thereby generating two-dimensional information representing the shape of a contacting or approaching object. The synthesis circuitry 46 outputs the two-dimensional information as an output Vout of the detector 40. Alternatively, the synthesis circuitry 46 may generate an image based on the two-dimensional information and sets the image information as an output Vout.

The detection IC 18 (see FIG. 2) described above functions as the detector 40 illustrated in FIG. 5. A part of the functions of the detector 40 may be included in the display IC 19 or may be arranged as a function of an external micro-processing unit (MPU).

Figure 6:
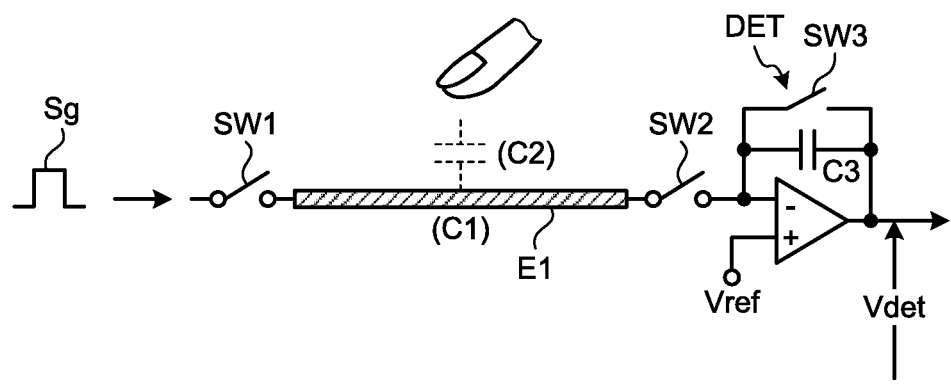
FIG. 6 is a schematic diagram that illustrates the basic principle of touch detection of a self-capacitance type.
Figure 7:
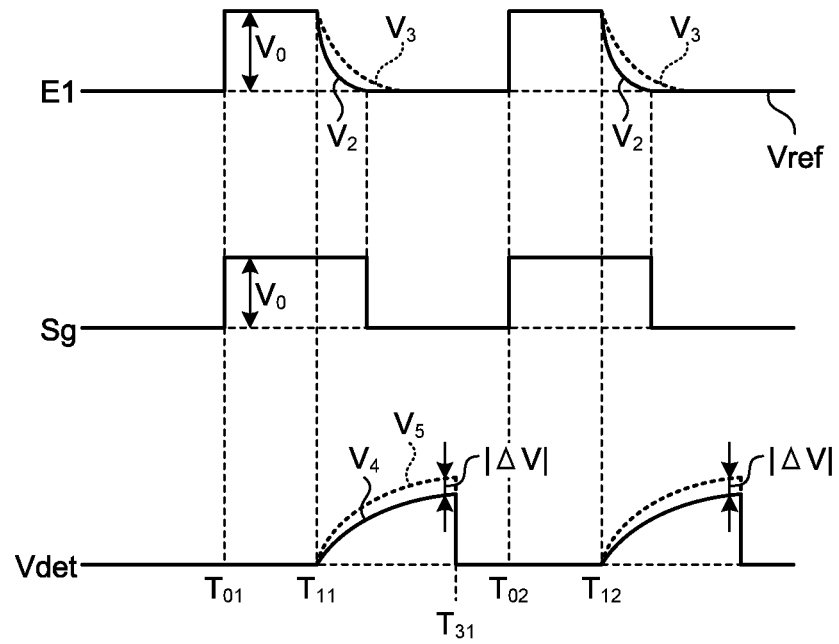
FIG. 7 is a diagram that illustrates an example of the waveforms of a drive signal and a detection signal of touch detection of the self-capacitance type.

As described above, the fingerprint sensor 10 operates based on the basic principle of touch detection of the capacitance type. Next, the basic principle of touch detection of the self-capacitance type of the fingerprint sensor according to this embodiment will be described with reference to FIGS. 6 and 7. FIG. 6 is a schematic diagram that illustrates the basic principle of touch detection of the self-capacitance type. In FIG. 6, a finger is used as an example of an external detected object. FIG. 7 is a diagram that illustrates an example of the waveforms of a drive signal and a detection signal of touch detection of the self-capacitance type. In FIG. 6, a detection circuit is additionally illustrated.

In a state in which a finger is sufficiently separate, an AC rectangular wave Sg of a predetermined frequency (for example, several kHz to several hundreds of kHz) is applied to the detection electrode E1. The detection electrode E1 includes capacitance C1, and a current according to the capacitance C1 flows therethrough. A voltage detector DET converts a change in the current according to the AC rectangular wave Sg into a change (a waveform $V_4$ of a solid line (see FIG. 7)) in the voltage.

Next, as illustrated in FIG. 6, in a state in which a finger is in contact therewith or approaches, capacitance C2 between the finger and the detection electrode E1 is added to the capacitance C1 of the detection electrode E1. Accordingly, when the AC rectangular wave Sg is applied to the detection electrode E1, a current according to the capacitance C1 and the capacitance C2 flows. As illustrated in FIG. 7, the voltage detector DET converts a change in the current according to the AC rectangular wave Sg into a change (a waveform $V_5$ of a dotted line) in the voltage. Then, based on the absolute value $|\Delta V|$ of a difference between the waveform $V_4$ and the waveform $V_5$, the presence/absence of a finger (presence/absence of a touch) can be measured.

More specifically, in the case illustrated in FIG. 7, the AC rectangular wave Sg rises to a voltage level corresponding to a voltage $V_0$ at timing of time $T_{01}$. At this time, a switch SW1 is turned on, and a switch SW2 is turned off, whereby the electric potential of the detection electrode E1 also rises to the voltage $V_0$. Next, the switch SW1 is turned off before timing of time $T_{11}$. At this time, while the detection electrode E1 is in a floating state, the electric potential of the detection electrode E1 is maintained to $V_0$ in accordance with the capacitance C1 (or C1+C2; see FIG. 6) of the detection electrode E1. In addition, before the timing of the time $T_{11}$, an operation of resetting the voltage detector DET is performed.

Subsequently, when the switch SW2 is turned on at the timing of the time $T_{11}$, electric charge accumulated in the capacitance C1 (or C1+C2) of the detection electrode E1 moves to the capacitor C3 disposed inside the voltage detector DET, and accordingly, the output of the voltage detector DET rises (see the detection signal Vdet illustrated in FIG. 7). When a finger or the like does not approach the detection electrode E1, the output (the detection signal Vdet) of the voltage detector DET is a waveform $V_4$ denoted using a solid line, and Vdet=C1×$V_0$/C3. On the other hand, in a case where capacitance according to the influence of a finger or the like is added, the output is a waveform $V_5$ denoted using a dotted line, and Vdet=(C1+C2)×$V_0$/C3.

Thereafter, by turning off the switch SW2 and turning on the switches SW1 and SW3 at timing of time $T_{31}$, the electric potential of the detection electrode E1 is set to a low level that is the same electric potential as that of the AC rectangular wave Sg, and the voltage detector DET is reset. The operation described above is repeated at a predetermined frequency (for example, about several kHz to several hundreds of kHz).

Figure 8:
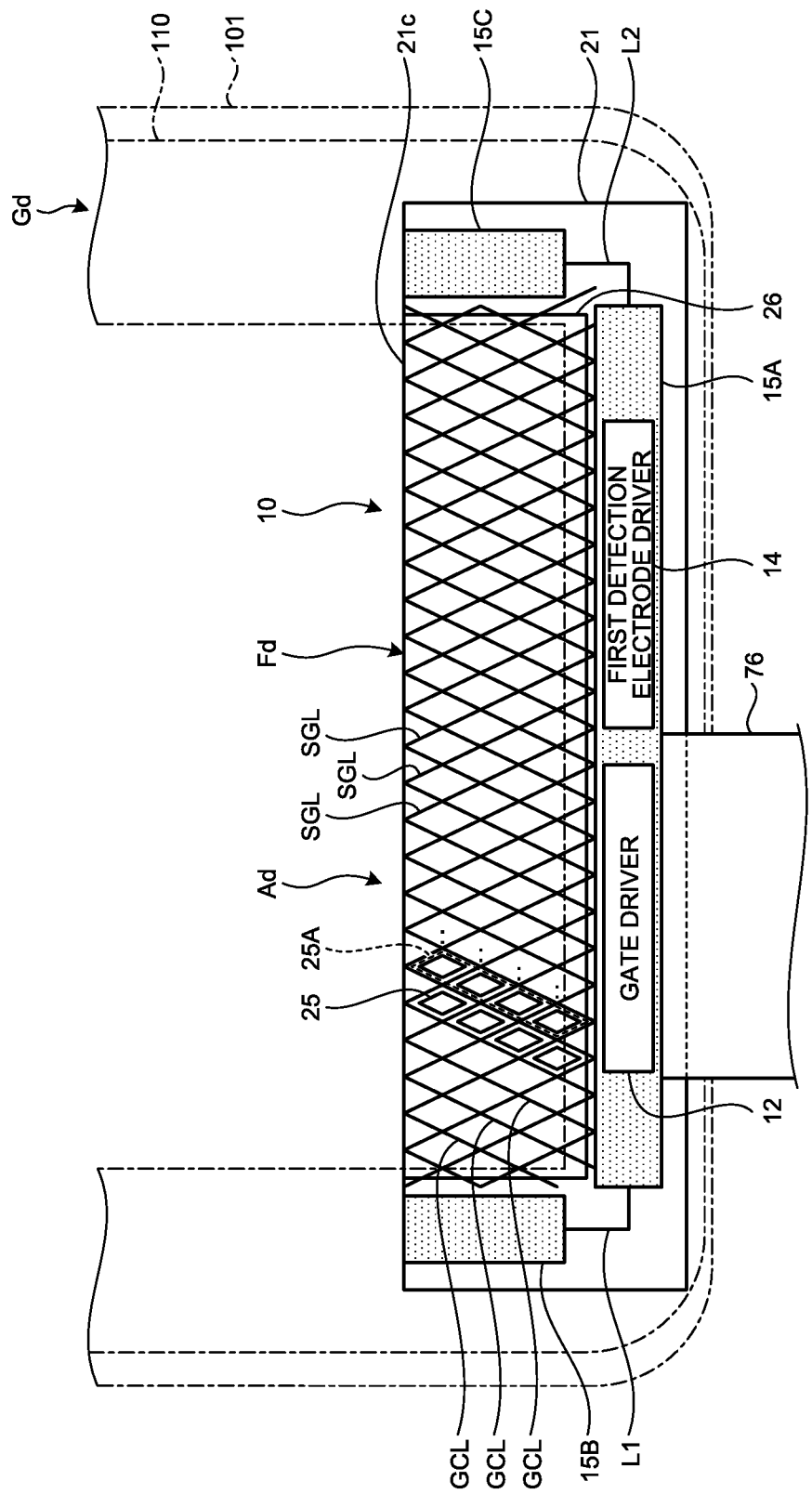
FIG. 8 is a plan view that schematically illustrates the whole configuration of a first detection electrode, a shield electrode, a gate line, and a signal line of a fingerprint sensor according to the first embodiment.
Figure 9:
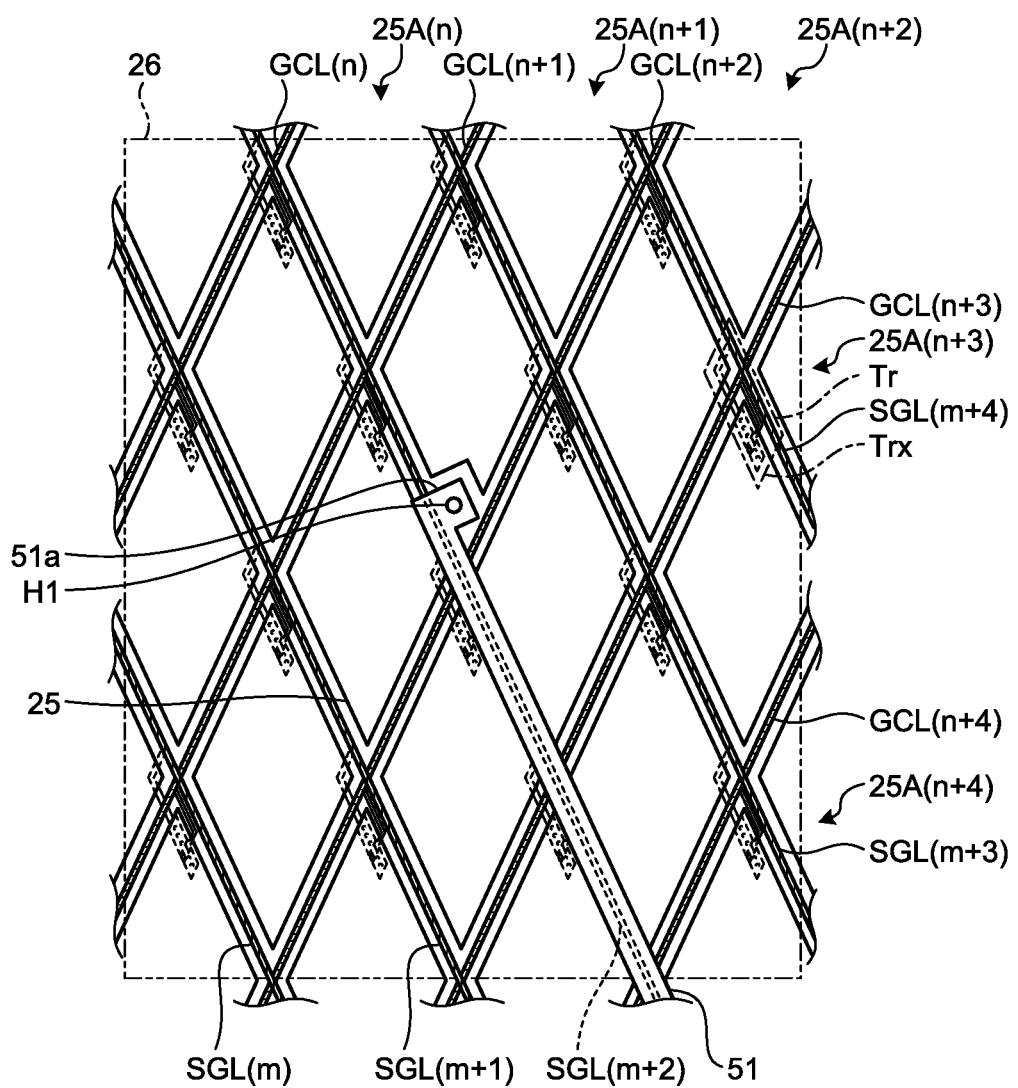
FIG. 9 is a schematic plan view that illustrates the configuration of the first detection electrode and each wiring in an enlarged scale.

FIG. 8 is a plan view that schematically illustrates the whole configuration of a first detection electrode, a shield electrode, a gate line, and a signal line of the fingerprint sensor according to the first embodiment. FIG. 9 is a schematic plan view that illustrates the configuration of the first detection electrode and each wiring in an enlarged scale.

As illustrated in FIG. 8, when viewed from a direction perpendicular to the first face 101a (see FIG. 2) of the cover member 101, the sensor base 21 of the fingerprint sensor 10 is disposed to overlap with the fingerprint detection area Fd that is a part of the display area Ad and a part of the frame area Gd. An end portion 21c of the sensor base 21 that is disposed on a side opposite to a side to which the flexible substrate 76 is coupled is disposed along the short side of the display area Ad and overlaps with the frame area Gd, the display area Ad, and the frame area Gd. While the sensor base 21 has a rectangular shape having a long side along the short side of the display area Ad, the shape of the sensor base 21 is not limited thereto but may be properly changed.

In addition, while the cover member 101 is disposed on a further upper side than the fingerprint sensor 10, the cover member 101 and the decoration layer 110 are denoted using dashed lines in order to allow the drawing to be easily viewed in FIG. 8. As illustrated in FIG. 8, while the decoration layer 110 is disposed to have a gap from the outer periphery of the cover member 101, the decoration layer 110 is not limited thereto but may be disposed up to a position coinciding with the outer periphery of the cover member 101.

A plurality of the first detection electrodes 25 are arranged in a matrix pattern (a row-column configuration) in the fingerprint detection area Fd that is a part of the display area Ad. Each of the first detection electrodes 25 has a rhombus shape, and the first detection electrodes 25 are arranged such that the sides of the rhombus shapes face each other. In FIG. 8, in order to allow the drawing to be easily viewed, while only some of the first detection electrodes 25 are illustrated, the first detection electrodes 25 may be disposed in the whole fingerprint detection area Fd.

The shield electrode 26 overlaps with the first detection electrodes 25 and is disposed to be continuous over the whole fingerprint detection area Fd. In other words, the first detection electrode 25 has an area smaller than the shield electrode 26, and a plurality of the first detection electrodes 25 are arranged for one shield electrode 26. In addition, in FIG. 8, while one shield electrode 26 is disposed in the fingerprint detection area Fd, a plurality of shield electrodes 26 may be disposed, and, for example, a plurality of shield electrodes 26 may be arranged in a matrix pattern.

As illustrated in FIGS. 8 and 9, a plurality of gate lines GCL and a plurality of signal lines SGL are disposed to overlap with the shield electrode 26. The gate lines GCL incline with respect to the long side of the display area Ad. The signal lines SGL incline in a direction opposite to the direction of the gate lines GCL with respect to the direction along the long side of the display area Ad. The signal lines SGL and the gate lines GCL intersect with each other and are arranged in a mesh shape. In an area surrounded by the signal lines SGL and the gate lines GCL, each of the first detection electrodes 25 having a rhombus shape is disposed. While the first detection electrode 25 has a rhombus shape of which four sides are the same, the first detection electrode 25 is not limited thereto but, for example, may be a parallelogram shape, a rectangular shape, a square shape, or the like.

As illustrated in FIG. 8, in the frame area Gd, circuitries 15A, 15B, and 15C including drive circuits such as the gate driver 12 and the first detection electrode driver 14 described above, and the like are formed in the sensor base 21. The gate driver 12 includes a scan signal generator that generates a scan signal Vscan, a gate scanner that selects a gate line GCL, and the like. In addition, the first detection electrode driver 14 includes a drive signal generator that generates a drive signal Vf for detection, a selection circuit such as a multiplexer that selects a signal line SGL, and the like.

The circuitry 15A is disposed on the short side of the frame area Gd, in other words, at a position overlapping with a side of the frame area Gd to which the flexible substrate 76 is coupled and is coupled to the signal line SGL and the gate line GCL disposed on the side of the short side of the frame area Gd. The circuitry 15B is disposed on one long side of the frame area Gd, and the circuitry 15C is disposed on the other long side of the frame area Gd. The circuitries 15B and 15C are coupled to the signal lines SGL and the gate lines GCL disposed on the side of the long side of the frame area Gd.

The circuitries 15B and 15C are electrically coupled to the circuitry 15A respectively through wirings L1 and L2. The circuitries 15A, 15B, and 15C are electrically coupled to the flexible substrate 76 and operate according to a control signal from the detection IC 18. A plurality of the first detection electrodes 25 of the fingerprint detection area Fd are sequentially selected and driven by the circuitries 15A, 15B, and 15C.

In this way, since the circuitries 15A, 15B, and 15C and the first detection electrode 25 are disposed in the same sensor base 21, the lengths of various wirings coupling the circuitries 15A, 15B, and 15C and the first detection electrode 25 can be shortened. For this reason, the responsiveness of a detection operation for a plurality of the first detection electrodes 25 is improved, and the detection performance can be improved.

As illustrated in FIG. 9, at each of the intersections between the signal lines SGL and the gate lines GCL, a first switching element Tr and a second switching element Trx are disposed. The first switching element Tr and the second switching element Trx are disposed at each of the positions of the first detection electrodes 25. The first switching element Tr can perform switching between coupling and breaking between the signal line SGL and the first detection electrode 25. The second switching element Trx can perform switching between coupling and breaking between the first detection electrode 25 and the shield electrode 26.

The first switching element Tr is configured by a thin film transistor and, in this example, is configured by a TFT of an n-channel metal oxide semiconductor (MOS) type. The second switching element Trx performs a switching operation that is opposite to that of the first switching element Tr. In this example, the second switching element Trx is configured by a p-channel MOS-type TFT. A same scan signal is supplied to the first switching element Tr and the second switching element Trx, and, for example, when the scan signal is at a high level, the first switching element Tr is turned on, and the second switching element Trx is turned off. When the scan signal is at a low level, the first switching element Tr is turned off, and the second switching element Trx is turned on.

As illustrated in FIG. 8, the gate lines GCL are coupled to the gate driver 12 disposed in the sensor base 21. The gate driver 12 sequentially selects a plurality of gate lines GCL(n), GCL(n+1), . . . GCL(n+4) illustrated in FIG. 9 and sequentially supplies a scan signal Vscan to the selected gate lines GCL(n), GCL(n+1), . . . GCL(n+4). The first switching element Tr is switched between On and Off in accordance with the scan signal Vscan. A plurality of the first detection electrodes 25 arranged along the gate lines GCL are selected as the first detection electrode block 25A of a detection target. A scan signal Vscan of a high level is supplied to the first switching element Tr corresponding to each first detection electrode 25 of the first detection electrode block 25A.

The signal lines SGL are coupled to the first detection electrode driver 14 disposed in the sensor base 21. The first detection electrode driver 14 sequentially selects a plurality of signal lines SGL(m), SGL(m+1), . . . SGL(m+4) and supplies a drive signal Vf to the selected signal lines SGL(m), SGL(m+1), . . . SGL(m+4). In this way, the drive signal Vf is supplied to each first detection electrode 25 of the first detection electrode block 25A that is a detection target through the signal line SGL and the first switching element Tr. When the drive signal Vf is supplied, each first detection electrode 25 outputs a signal according to a change in the capacitance to the detection IC 18 described above through the signal line SGL. In this way, the fingerprint of the contacting or approaching finger can be detected. The first detection electrode 25 corresponds to the detection electrode E1 according to the basic principle of touch detection of the self-capacitance type described above.

As illustrated in FIG. 9, a conductive wiring 51 is coupled to the shield electrode 26 through a contact hole H1. In this embodiment, one conductive wiring 51 is coupled to one shield electrode 26. The conductive wiring 51 is drawn from the fingerprint detection area Fd to the frame area Gd and is coupled to the circuitry 15A. The circuitry 15A supplies a guard signal Vsgl to the conductive wiring 51. The guard signal Vsgl is a voltage signal having a same waveform synchronized with the drive signal Vf. The guard signal Vsgl is a voltage signal configured to suppress a change in the capacitance between the first detection electrode 25 and the shield electrode 26 at the time of supplying the drive signal Vf. By supplying the drive signal Vf to the first detection electrode 25 and by supplying the guard signal Vsgl to the shield electrode 26 in synchronization therewith, the shield electrode 26 facing the first detection electrode 25 is dropped to the same electric potential as that of the first detection electrode 25. In this way, parasitic capacitance between the first detection electrode 25 and the shield electrode 26 at the time of supplying the drive signal Vf decreases. Accordingly, a decrease in the detection sensitivity of the fingerprint sensor 10 can be suppressed.

In the case illustrated in FIG. 9, while a center portion of the shield electrode 26 is coupled to the conductive wiring 51, an end portion of the shield electrode 26 may be coupled to the conductive wiring 51. In addition, a plurality of portions of one conductive wiring 51 may be disposed in the shield electrode 26. Alternatively, a plurality of conductive wirings 51 may be disposed in one shield electrode 26 and coupled thereto at a plurality of positions.

In addition, the first detection electrode 25 can be coupled to the shield electrode 26 through the second switching element Trx. In a first detection electrode 25 not selected as the first detection electrode block 25A that is a detection target among a plurality of the first detection electrodes 25, the first switching element Tr is turned off, and the second switching element Trx is turned on. For this reason, the guard signal Vsgl is supplied to the first detection electrodes 25 disposed on the periphery of the first detection electrode block 25A(n) through the shield electrode 26. Accordingly, the electrodes disposed on the periphery of the first detection electrode block 25A(n) selected as the detection target is dropped to the same electric potential as that of the first detection electrode block 25A(n). In this way, parasitic capacitance between each first detection electrode 25 of the first detection electrode block 25A(n) and the first detection electrodes 25 disposed on the periphery thereof is decreased. Accordingly, a decrease in the detection sensitivity of the fingerprint sensor 10 can be suppressed.

The gate lines GCL, the signal lines SGL, and the conductive wiring 51 are formed using at least one metal material of aluminum (Al), copper (Cu), silver (Ag), and molybdenum (Mo) and an alloy thereof. In addition, the conductive wiring 51 may be a stacked body in which a plurality of layers are stacked using one or more such metal materials. Furthermore, in order to suppress reflectivity, it is also preferable to perform a blackening process for the uppermost surfaces of the gate lines GCL, the signal lines SGL, and the conductive wiring 51.

As illustrated in FIG. 9, the conductive wiring 51 is disposed to overlap with the signal lines SGL and is disposed along the signal line SGL. For this reason, it can be suppressed that the signal lines SGL are visually recognized. In addition, the conductive wiring 51, the signal lines SGL, and the gate lines GCL are disposed to incline with respect to a direction along the long side of the display area Ad. In other words, since the conductive wiring 51, the signal lines SGL, and the gate lines GCL incline with respect to the arrangement direction of pixels Pix of the display panel 30, the generation of moire is suppressed.

Figure 10:
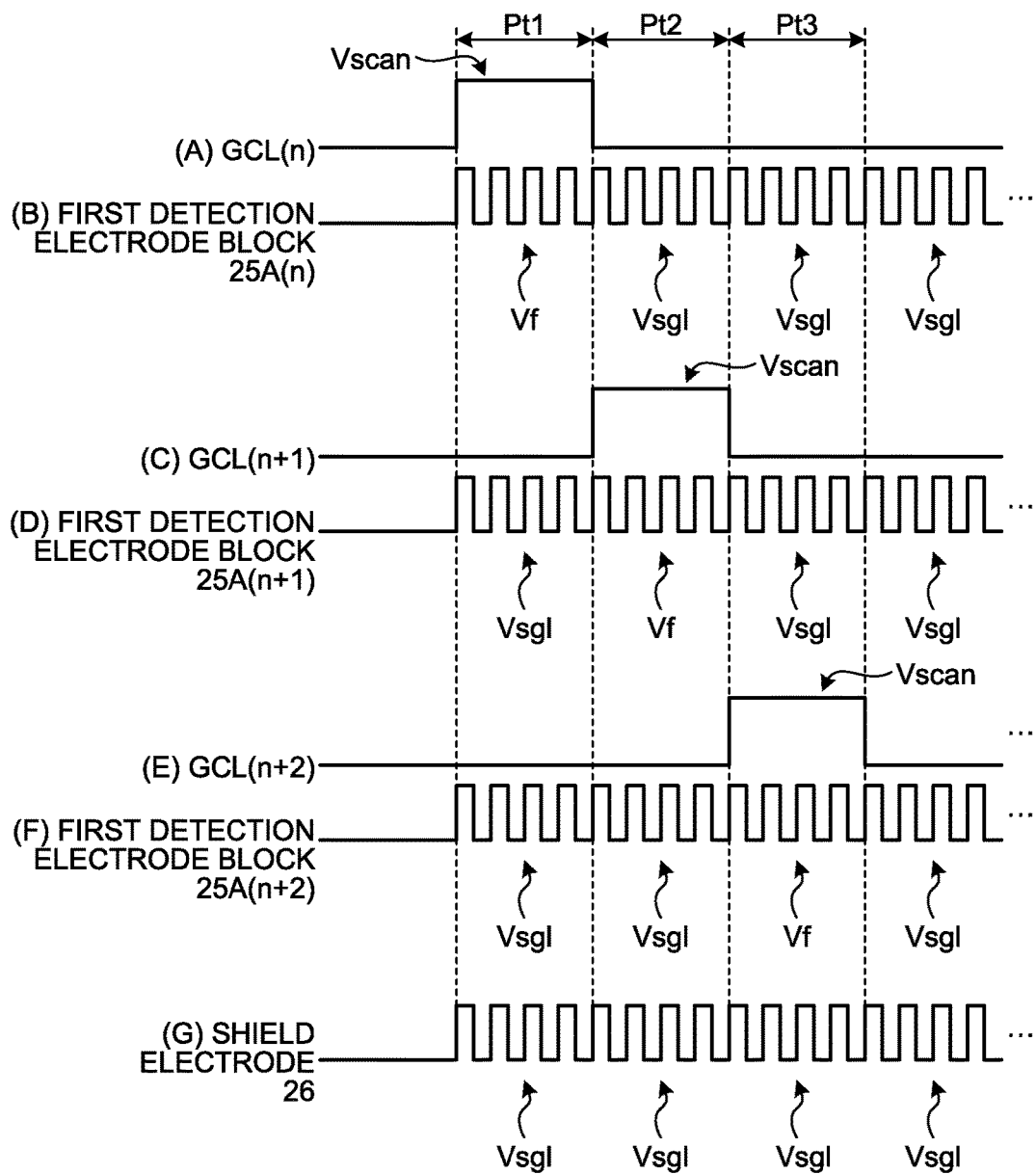
FIG. 10 is a timing waveform diagram of a fingerprint sensor according to the first embodiment.

Next, an example of the detection operation performed by the fingerprint sensor 10 will be described. FIG. 10 is a timing waveform diagram of the fingerprint sensor according to the first embodiment. As illustrated in FIG. 10, detection periods Pt1, Pt2, Pt3, . . . are arranged in a time-divisional manner. In the detection period Pt1, the n-th gate line GCL(n) is selected, and the scan signal Vscan is in the On state (high level). The first switching element Tr coupled to the n-th gate line GCL(n) is supplied with the scan signal Vscan and is turned on. In this way, a drive signal Vf is supplied to each first detection electrode 25 of the first detection electrode block 25A(n) corresponding to the gate line GCL(n) through the signal line SGL(n).

In the detection period Pt1, a guard signal Vsgl is supplied to the shield electrode 26. On the other hand, in the gate lines GCL(n+1) and GCL(n+2) that are not selected, the scan signal Vscan is in the Off state (low level). For this reason, the second switching elements Trx coupled to the gate lines GCL(n+1) and GCL(n+2) are turned on. A guard signal Vsgl is supplied to the first detection electrode blocks 25A(n+1), 25A(n+2), . . . that are not selected through the shield electrode 26. In this way, parasitic capacitance between the first detection electrode 25 and the shield electrode 26, and parasitic capacitance between the first detection electrode block 25A(n) and the first detection electrodes 25 disposed on the periphery of the first detection electrode block 25A(n) are decreased. Accordingly, a decrease in the detection sensitivity of the fingerprint sensor 10 can be suppressed.

Next, in the detection period Pt2, the (n+1)-th gate line GCL(n+1) is selected, and the scan signal Vscan is in the On state (high level). The first switching element Tr coupled to the (n+1)-th gate line GCL(n+1) is supplied with a scan signal Vscan and is turned on. In this way, a drive signal Vf is supplied to each first detection electrode 25 of the first detection electrode block 25A(n+1) corresponding to the gate line GCL(n+1) through the signal line SGL(n+1). In the detection period Pt2, a guard signal Vsgl is supplied to the shield electrode 26 and the first detection electrode blocks 25A(n) and 25A(n+2) that are not selected.

In the detection period Pt3, the (n+2)-th gate line GCL (n+2) is selected, and the scan signal Vscan is in the On state (high level). The first switching element Tr coupled to the (n+2)-th gate line GCL(n+2) is supplied with a scan signal Vscan and is turned on. In this way, a drive signal Vf is supplied to each first detection electrode 25 of the first detection electrode block 25A(n+2) corresponding to the gate line GCL(n+2) through the signal line SGL(n+2). In the detection period Pt3, a guard signal Vsgl is supplied to the shield electrode 26 and the first detection electrode blocks 25A(n) and 25A(n+1) that are not selected.

By repeating this, in the fingerprint detection area Fd, a detection signal Vdet is output from the first detection electrode 25 disposed at a position which the finger is in contact with or approaches to the detector 40 (see FIG. 1) based on the detection principle of the self-capacitance type described above. In this way, a fingerprint detecting operation is performed by the fingerprint sensor 10.

Figure 11:
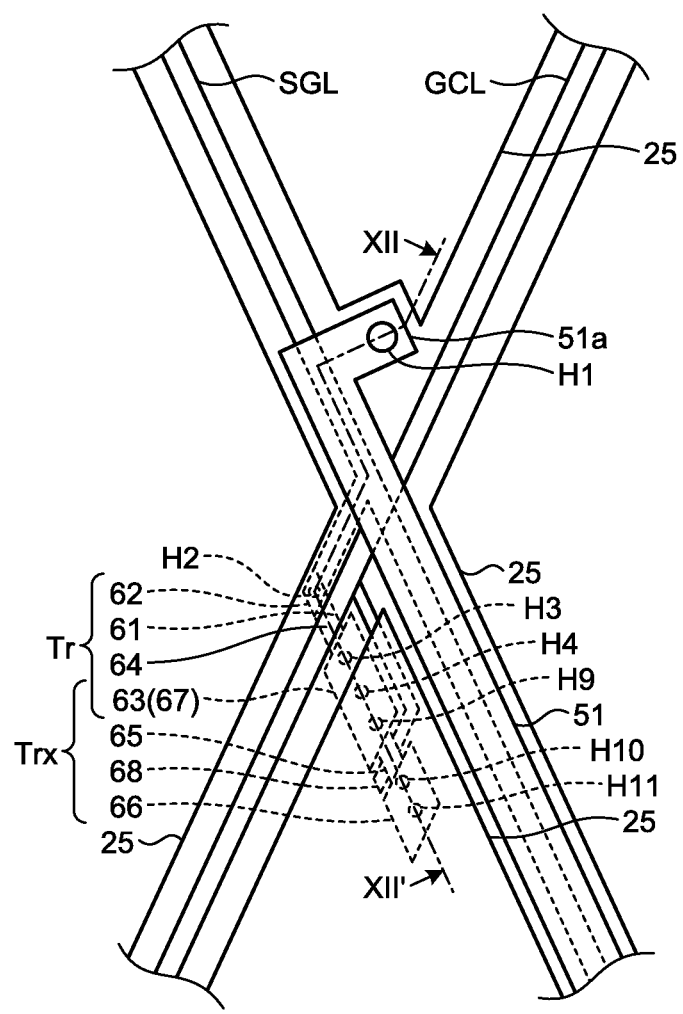
FIG. 11 is a plan view that illustrates the configuration of a first detection electrode and a switching element.
Figure 12:
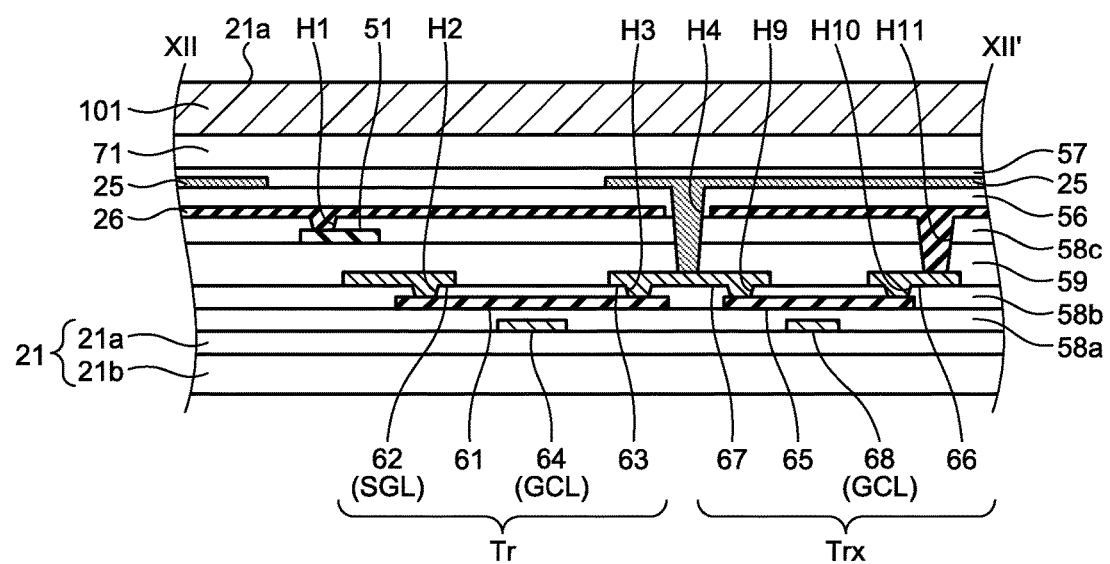
FIG. 12 is a cross-sectional view taken along line XII-XII' illustrated in FIG. 11.

Next, the configuration of the first detection electrode 25, the shield electrode 26, the first switching element Tr, and the second switching element Trx will be described. FIG. 11 is a plan view that illustrates the configuration of the first detection electrode and the switching element. FIG. 12 is a cross-sectional view taken along line XII-XII' illustrated in FIG. 11.

As illustrated in FIG. 11, the sides of the first detection electrodes 25 adjacent to each other face each other with a gap interposed therebetween, and the gate line GCL and the signal line SGL are disposed to intersect with each other between the first detection electrodes 25. Near the intersection between the gate line GCL and the signal line SGL, the first detection electrode 25 is coupled to a drain electrode 63 of the first switching element Tr through a contact hole H4. In FIG. 12, in order to allow the drawing to be easily viewed, while the shield electrode 26 is not illustrated, as described above, the shield electrode 26 is arranged to overlap with a plurality of the first detection electrodes 25, the gate line GCL, and the signal line SGL.

As illustrated in FIGS. 11 and 12, the first switching element Tr includes a semiconductor layer 61, a source electrode 62, a drain electrode 63, and a gate electrode 64. In addition, the second switching element Trx includes a semiconductor layer 65, a source electrode 66, a drain electrode 67, and a gate electrode 68. In this example, as the drain electrode 67 of the second switching element Trx, an electrode common to the drain electrode 63 of the first switching element Tr is used.

As illustrated in FIG. 12, the sensor base 21 includes a film base 21b and a resin layer 21a disposed on the film base 21b. On the resin layer 21a of the sensor base 21, a gate electrode 64 and a gate electrode 68 (gate line GCL) are disposed. Above the upper side of the gate electrode 64 and the gate electrode 68 (gate line GCL), a semiconductor layer 61 and a semiconductor layer 65 are disposed via an insulating layer 58a. Above the upper side of the semiconductor layer 61 and the semiconductor layer 65, a drain electrode 63, a drain electrode 67, a source electrode 62 (signal line SGL), and a source electrode 66 are disposed through an insulating layer 58b. Above the upper side of the drain electrode 63, the drain electrode 67, the source electrode 62 (signal line SGL), and the source electrode 66, a conductive wiring 51 is disposed via a flattening layer 59. Above the upper side of the conductive wiring 51, a shield electrode 26 is disposed through an insulating layer 58c. As described above, on the upper side of the shield electrode 26, the insulating layer 56 is disposed, and the first detection electrode 25 is disposed on the insulating layer 56.

As illustrated in FIG. 12, the second switching element Trx is disposed in the same layer as that of the first switching element Tr. However, the configuration is not limited thereto, but the second switching element Trx may be disposed in a layer different from that of the first switching element Tr.

As illustrated in FIGS. 11 and 12, in the first switching element Tr, the semiconductor layer 61 is coupled to the drain electrode 63 through a contact hole H3. The semiconductor layer 61 intersects with the gate line GCL in the planar view. A portion of the gate line GCL that overlaps with the semiconductor layer 61 functions as the gate electrode 64. The semiconductor layer 61 is disposed along the signal line SGL and bends at a position overlapping with the signal line SGL. The semiconductor layer 61 is electrically coupled to the signal line SGL through a contact hole H2. Here, a portion of the signal line SGL that overlaps with the semiconductor layer 61 functions as the source electrode 62. In this way, the signal line SGL and the first switching element Tr and the gate line GCL and the first switching element Tr are electrically coupled. In addition, in FIG. 11, while there is one portion of the semiconductor layer 61 that intersects with the gate line GCL, the semiconductor layer 61 may be bent to intersect with the gate line GCL twice.

In the second switching element Trx, the semiconductor layer 65 is coupled to the drain electrode 67 through a contact hole H9. The drain electrode 67 is coupled to the first detection electrode 25 through a contact hole H4. The semiconductor layer 65 is disposed along the signal line SGL and intersects with the gate line GCL in the planar view. A portion of the gate line GCL that overlaps with the semiconductor layer 65 functions as the gate electrode 68. As illustrated in FIG. 11, the gate electrode 68 of the second switching element Trx is disposed to branch from the gate line GCL and is electrically coupled to the gate electrode 64 of the first switching element Tr. In other words, the first switching element Tr and the second switching element Trx share the gate line GCL. The semiconductor layer 65 is coupled to the source electrode 66 through a contact hole H10, and the source electrode 66 is coupled to the shield electrode 26 through a contact hole H11. In this way, the first detection electrode 25 and the second switching element Trx, and the shield electrode 26 and the second switching element Trx are electrically coupled.

As the material of the semiconductor layers 61 and 65, a known material such as polysilicon or oxide semiconductor may be used. For example, transparent amorphous oxide semiconductor (TAOS) may be used.

As illustrated in FIG. 11, a tab part 51a is coupled to the conductive wiring 51. The tab part 51a is disposed near an intersection between the signal line SGL and the gate line GCL and protrudes in a direction intersecting with the conductive wiring 51. The tab part 51a is disposed at a position not overlapping with the signal line SGL and is electrically coupled to the shield electrode 26 (not illustrated in FIG. 11) through the contact hole H1. In this way, the shield electrode 26 and the conductive wiring 51 are electrically coupled.

According to such a configuration, the first detection electrode 25 is arranged to a further first face 101a side, which is a detection face of the cover member 101, than the first switching element Tr, the second switching element Trx, the shield electrode 26, and each wiring. In this way, a distance between the finger that is a detection target and the first detection electrode 25 is shortened, and excellent detection sensitivity is acquired. In addition, the shield electrode 26 is disposed between the first detection electrode 25 and the first switching element Tr, between the first detection electrode 25 and the second switching element Trx, and between the first detection electrode 25 and each wiring. In this way, a change in the capacitance of the first detection electrode 25 according to a change in the voltage of each wiring can be suppressed.

Figure 13:
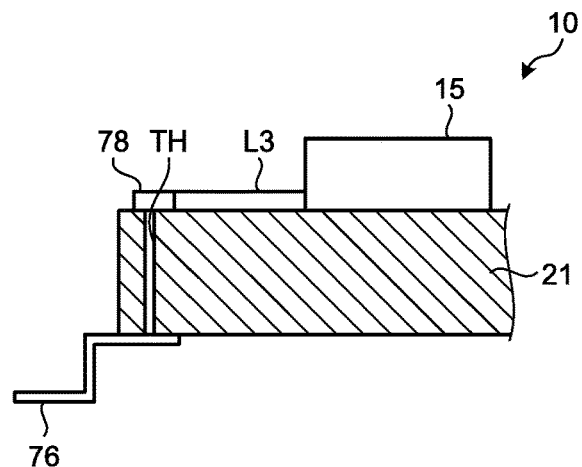
FIG. 13 is a cross-sectional view that schematically illustrates an example of a coupling structure between a fingerprint sensor and a flexible substrate according to the first embodiment.

Next, a coupling structure between the fingerprint sensor 10 and the flexible substrate 76 will be described. FIG. 13 is a cross-sectional view that schematically illustrates an example of the coupling structure between the fingerprint sensor and the flexible substrate according to the first embodiment. In the example illustrated in FIG. 3, while the flexible substrate 76 is coupled to the upper face side of the sensor base 21, the coupling structure is not limited thereto.

As illustrated in FIG. 13, a wiring L3 is drawn from a circuitry 15 disposed in the sensor base 21. In addition, in FIG. 13, as the circuitry 15, a circuitry including drive circuits such as the gate driver 12 and the first detection electrode driver 14 described above is schematically illustrated. A terminal part 78 of the wiring L3 is electrically coupled to the flexible substrate 76 disposed on the lower face of the sensor base 21 through a through hole TH. According to such a configuration, the flexible substrate 76 can be coupled to a face disposed on a side opposite to the face on which the circuitry 15 and the wiring L3 are disposed. Accordingly, in the example illustrated in FIG. 13, the degree of freedom of the coupling position of the flexible substrate 76 and the routing of the wiring L3 can be increased.

Figure 14:
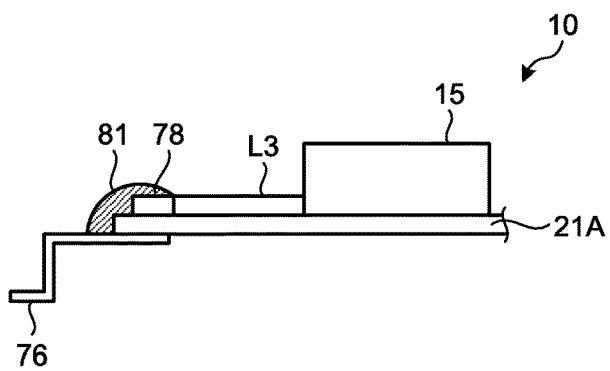
FIG. 14 is a cross-sectional view that schematically illustrates another example of a coupling structure between the fingerprint sensor and the flexible substrate according to the first embodiment.
Figure 15:
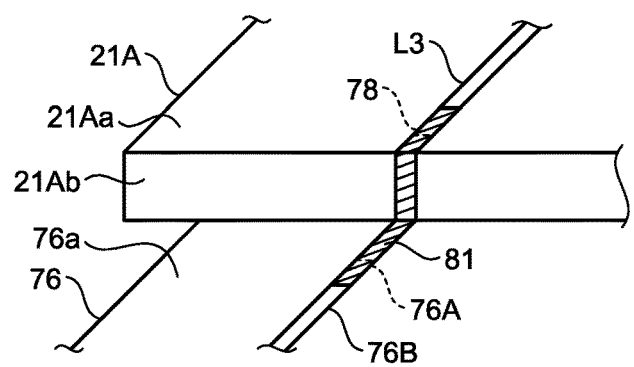
FIG. 15 is a perspective view that schematically illustrates another example of the coupling structure between the fingerprint sensor and the flexible substrate according to the first embodiment.

FIG. 14 is a cross-sectional view that schematically illustrates another example of a coupling structure between the fingerprint sensor and the flexible substrate according to the first embodiment. FIG. 15 is a perspective view that schematically illustrates another example of the coupling structure between the fingerprint sensor and the flexible substrate according to the first embodiment. As illustrated in FIG. 14, as the material of a sensor base 21A, for example, a glass substrate of a thin plate or a resin film base is used. On the upper face of the sensor base 21A, a wiring L3 drawn from the circuitry 15 and a terminal part 78 are disposed. On the lower face of the sensor base 21A, the flexible substrate 76 is disposed. The wiring L3 is electrically coupled to the flexible substrate 76 through a conductive body 81.

As illustrated in FIG. 15, the conductive body 81 is disposed to cover the terminal part 78 of the sensor base 21A. In addition, the conductive body 81 is disposed to be continuous on an upper face 21Aa and a side face 21Ab of the sensor base 21A and an upper face 76a of the flexible substrate 76 and is coupled to a terminal part 76A of a wiring 76B. In this way, the wiring L3 of the sensor base 21A and the wiring 76B of the flexible substrate 76 are electrically coupled to each other through the conductive body 81. According to the configurations illustrated in FIGS. 14 and 15, the flexible substrate 76 can be coupled to a face disposed on a side opposite to the face on which the circuitry 15 and the wiring L3 are disposed.

The conductive body 81, for example, is formed by discharging a liquid composition or a viscous composition having a conduction property using a dispenser or the like. As the conductive body 81, a conductive paste such as a silver paste is used. At this time, by adjusting the conductive paste to have proper viscosity, breaking of a wire in a different level portion formed by the sensor base 21A and the flexible substrate 76 is suppressed, and thus, the conductive body 81 can be continuously disposed.

As described above, the display device 1 according to this embodiment includes: the display panel 30 including the liquid crystal layer 6 (display function layer) that displays an image on the display area Ad; the first face 101a; the second face 101b disposed on the opposite side of the first face 101a, the cover member 101 that faces the display panel 30; a plurality of the first detection electrodes 25 that are disposed in the sensor base 21 and are configured to detect the unevenness of the surface of a finger being brought into contact with or approaching the first face 101a of the cover member 101; the shield electrode 26 that is disposed to face the plurality of the first detection electrodes 25 and is configured to suppress a change in the capacitance between the first detection electrodes 25 and the shield electrode 26; and the first switching elements Tr that are disposed respectively in correspondence with the first detection electrodes 25 and includes the fingerprint sensor 10 disposed between the cover member 101 and the display panel 30 in the display area Ad.

According to such a configuration, the fingerprint sensor 10 is disposed on a further cover member 101 side than the display panel 30. In this way, for example, a distance between the first detection electrode 25, which is a detection electrode, and the first face 101a, which is a detection face, can be smaller than that of a case where a detection electrode for detecting a fingerprint is disposed integrally with the display panel 30. Therefore, according to the display device 1 of this embodiment, the detection performance can be improved. In addition, the fingerprint sensor 10 detects the unevenness of a contacting or approaching finger or the like based on the detection principle of the self-capacitance type. Accordingly, the intensity of the electric field in a direction perpendicular to the first face 101a of the cover member 101 at the time of supplying the drive signal Vf to the first detection electrode 25 can be higher than that of the mutual-capacitance type. According to the display device 1 of this embodiment, by decreasing the area of the first detection electrode 25 of the fingerprint sensor 10, the resolution of the detection is increased, and excellent detection sensitivity is acquired.

Furthermore, since the shield electrode 26 facing the first detection electrodes 25 is disposed, a change in the capacitance on the side of the first detection electrode 25 opposite to the cover member 101 can be suppressed. Therefore, according to the display device 1 of this embodiment, a decrease in the detection sensitivity of the fingerprint sensor 10 can be suppressed.

Second Embodiment

Figure 16:
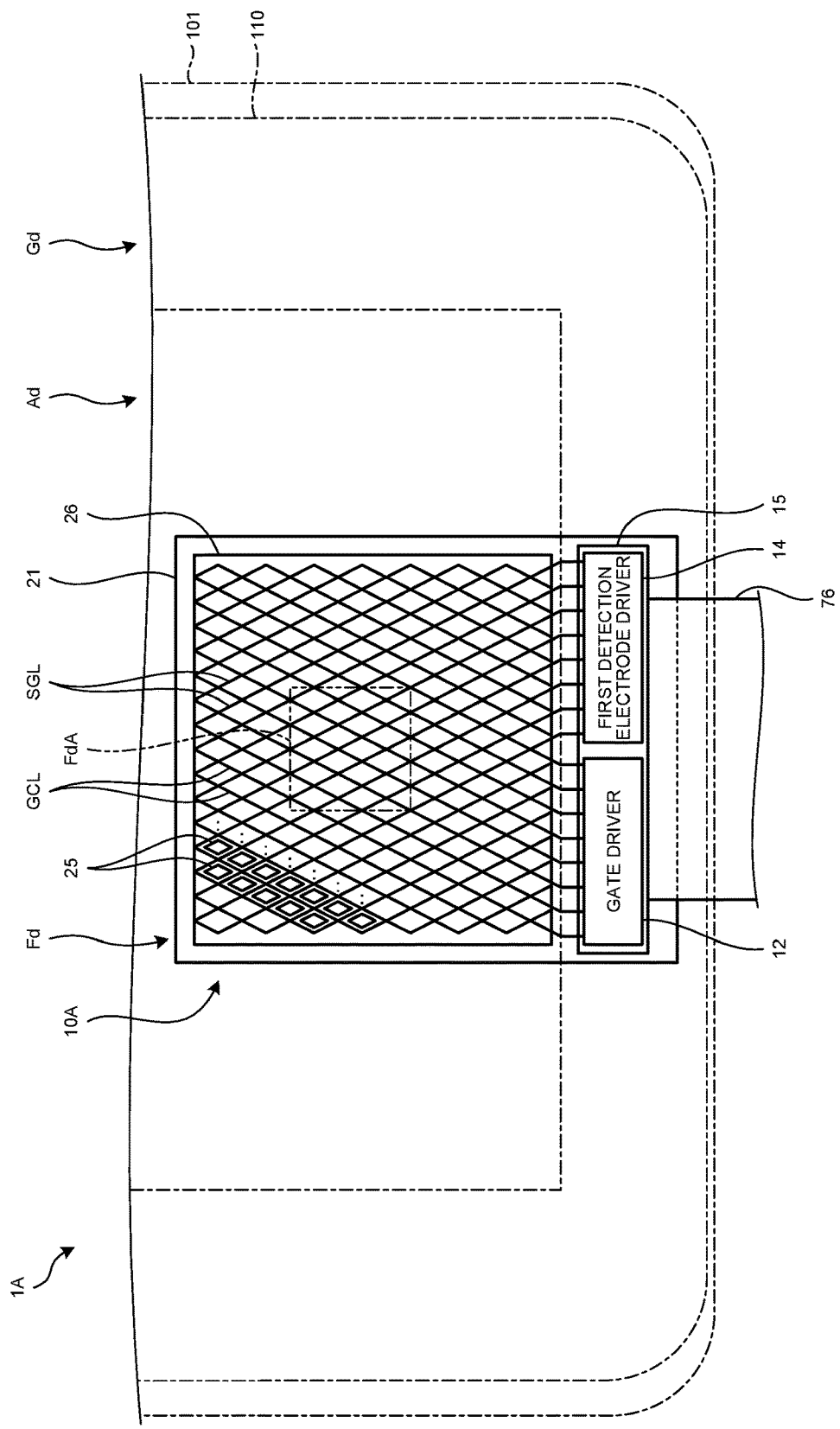
FIG. 16 is a schematic plan view that illustrates a display device according to a second embodiment.

FIG. 16 is a schematic plan view that illustrates a display device according to a second embodiment. As illustrated in FIG. 16, in a display device 1A according to this embodiment, a fingerprint sensor 10A is arranged at the center of the short side of a display area Ad. On both end sides of the short side of the display area Ad, in other words, at the corners of the display area Ad, the fingerprint sensor 10A is not disposed. In areas adjacent to the fingerprint sensor 10A in a direction along the short side of the display area Ad, an adhesive layer 71 and an adhesive layer 72 (not illustrated in FIG. 16) bonding a display panel 30 and a cover member 101 are disposed.

In this embodiment, a fingerprint detection area Fd is an area overlapping with the display area Ad and is a rectangular area protruding from the center of the short side of the display area Ad to the center of the in-plane direction. The sensor base 21 is disposed to be continuous from the fingerprint detection area Fd to a frame area Gd.

The configurations of first detection electrodes 25, a shield electrode 26, gate lines GCL, signal lines SGL, and the like are similar to those according to the first embodiment described above. Thus, a drive signal Vf is supplied to each first detection electrode 25, and a detection signal Vdet according to a change in the capacitance of the first detection electrode 25 is output. By the detection signal Vdet output from the first detection electrode 25, a detector 40 (see FIG. 5) can detect the unevenness of the surface of a finger or the like brought into contact with or approaching the fingerprint detection area Fd.

In this embodiment, since the first detection electrodes 25 of the fingerprint sensor 10A are disposed only at the center of the short side of the display area Ad, a circuitry 15 including a gate driver 12 and a first detection electrode driver 14 is arranged only at the center of the short side of the frame area Gd. The gate lines GCL and the signal lines SGL are drawn to the short side of the frame area Gd and are coupled to the circuitry 15. Since drive circuits such as the gate driver 12 and the first detection electrode driver 14, and the first detection electrodes 25 are disposed in a same sensor base 21, the responsiveness of a detection operation is improved, and the detection performance can be improved. In addition, since the area of the fingerprint detection area Fd is smaller than that according to the first embodiment, a time required for detection can be shortened, and the load of the calculation process performed in the detector 40 can be reduced.

The fingerprint sensor 10A is a fingerprint detector having a light transmitting property and is configured to be disposed through the display panel 30 and the adhesive layer 72 (see FIG. 2). For this reason, there is a little restriction according to the arrangement and the like of each member such as a polarizing plate 35 of the display panel 30 and each electrode, and the degree of freedom of the size and the arrangement of the fingerprint sensor 10A can be improved. Accordingly, as illustrated in FIG. 16, even in a case where the fingerprint detection area Fd is decreased in size and is disposed only in a part of the display area Ad, the fingerprint sensor 10A can be easily arranged in correspondence with the fingerprint detection area Fd.

In addition, as illustrated in FIG. 16, a fingerprint detection area FdA of a range further smaller than the fingerprint detection area Fd can be set as a detection area configured to detect a fingerprint. In such a case, in the fingerprint detection area FdA, the first detection electrodes 25, the gate lines GCL, and the signal lines SGL are disposed. In an area disposed on a further outer side than the fingerprint detection area FdA, the first detection electrode 25 may not be disposed, or dummy electrodes not functioning as detection electrodes may be disposed. Since the gate lines GCL and the signal lines SGL disposed in the fingerprint detection area FdA are drawn out up to an area disposed on a further outer side than the fingerprint detection area FdA, it is preferable to dispose dummy wirings in an area disposed on the further outer side than the fingerprint detection area FdA of the sensor base 21. As the material of the dummy wirings, the same material as that of the gate lines GCL and the signal lines SGL is used, and the dummy wirings are arranged at a same pitch as that of the gate lines GCL and the signal lines SGL. In this way, the wirings are arranged in the whole sensor base 21, and a difference in the light transmittance between a portion in which the gate lines GCL and the signal lines SGL are disposed and a portion in which the dummy wirings are disposed is decreased, whereby the visibility can be improved.

Figure 17:
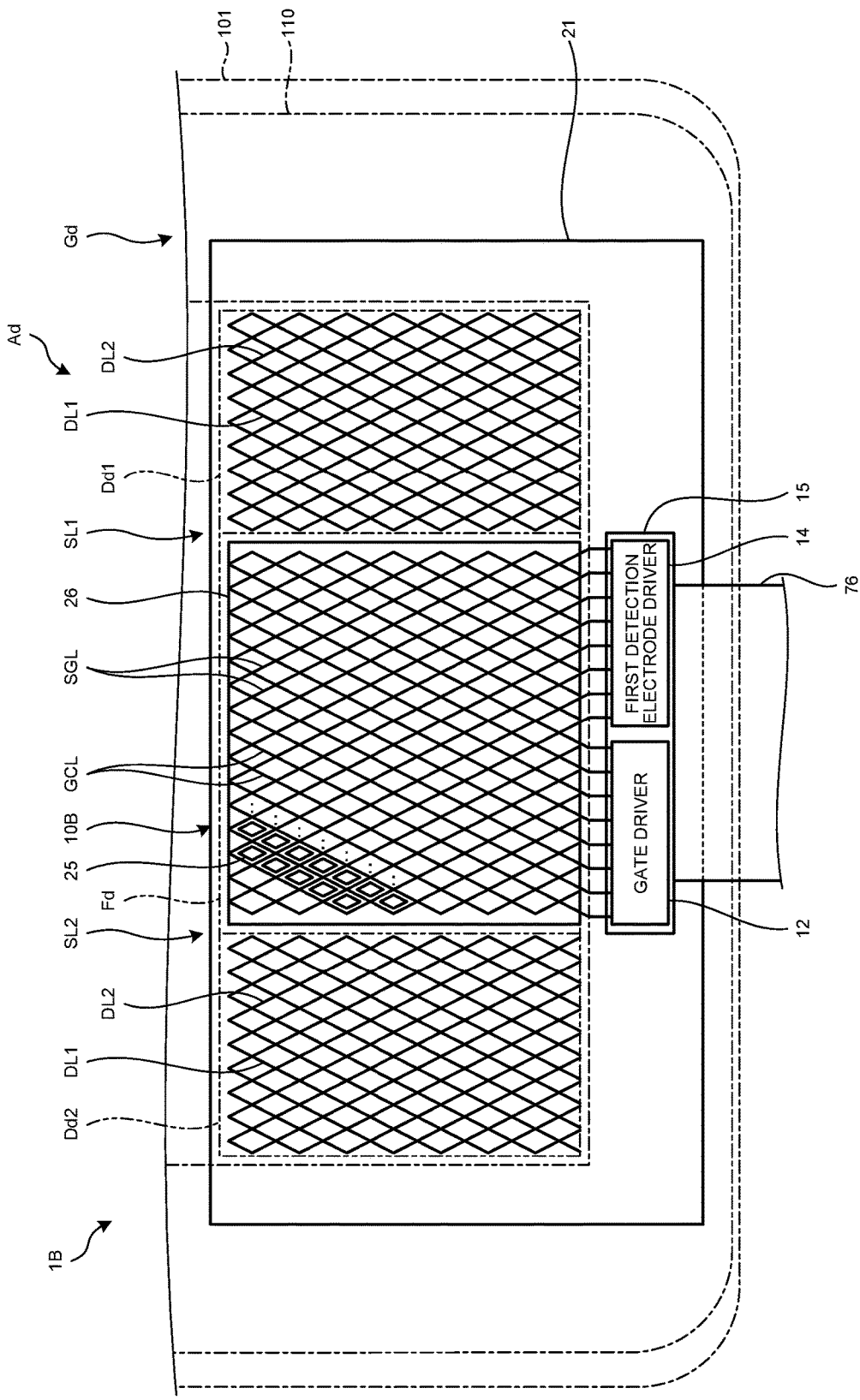
FIG. 17 is a schematic plan view that illustrates a fingerprint sensor of a display device according to a modification of the second embodiment.

FIG. 17 is a schematic plan view that illustrates a fingerprint sensor of a display device according to a modification of the second embodiment. In a display device 1B of this modification, similarly to the example illustrated in FIG. 16, a fingerprint detection area Fd is an area overlapping with a display area Ad and is a rectangular area protruding from the center of the short side of the display area Ad to the center in the in-plane direction. A sensor base 21 of a fingerprint sensor 10B is also disposed at a position overlapping with the long side of a frame area Gd on a further outer side than the fingerprint detection area Fd in a direction along the short side of the display area Ad.

As illustrated in FIG. 17, first detection electrodes 25 are disposed in the fingerprint detection area Fd, and, in a direction along the short side of the display area Ad, dummy areas Dd1 and Dd2 are disposed to be adjacent to the fingerprint detection area Fd. In the dummy areas Dd1 and Dd2, in a sensor base 21, a dummy wiring DL1 disposed along gate lines GCL and a dummy wiring DL2 disposed along signal lines SGL are disposed. As the material of the dummy wirings DL1 and DL2, the same material as that of the gate lines GCL and the signal lines SGL is used, and the dummy wirings DL1 and DL2 are arranged at a same pitch as the arrangement pitch of the gate lines GCL and the signal lines SGL.

The dummy wirings DL1 and DL2 of the dummy area Dd1 are electrically separated by a slit SL1 from the gate lines GCL and the signal lines SGL of the fingerprint detection area Fd. In addition, the dummy wirings DL1 and DL2 of the dummy area Dd2 are electrically separated from the gate lines GCL and the signal lines SGL of the fingerprint detection area Fd by a slit SL2. The dummy wirings DL1 and DL2 are wirings that are not coupled to the gate driver 12 and the first detection electrode driver 14 of the circuitry 15 and are not used for a detection operation.

According to such a configuration, even in a case where the fingerprint detection area Fd is disposed only in a part of the display area Ad, a difference in the light transmittance between the fingerprint detection area Fd and the dummy areas Dd1 and Dd2 can be decreased, whereby the visibility of a display image can be improved.

In the case illustrated in FIG. 17, while the dummy areas Dd1 and Dd2 are disposed in a part of the display area Ad, the dummy areas are not limited thereto but may be disposed in the whole area that does not overlap with the fingerprint detection area Fd in the display area Ad. In addition, in the case illustrated in FIG. 17, while not illustrated in the drawing, it may be configured such that dummy electrodes not functioning as detection electrodes are disposed in the dummy areas Dd1 and Dd2, and the dummy electrodes have the same shape and the same arrangement as those of the first detection electrode 25. The dummy electrodes may be disposed in a same layer as that of the shield electrode 26 continuously in the whole dummy area Dd1, or the dummy electrodes may be continuously disposed in the whole dummy area Dd2.

Third Embodiment

Figure 18:
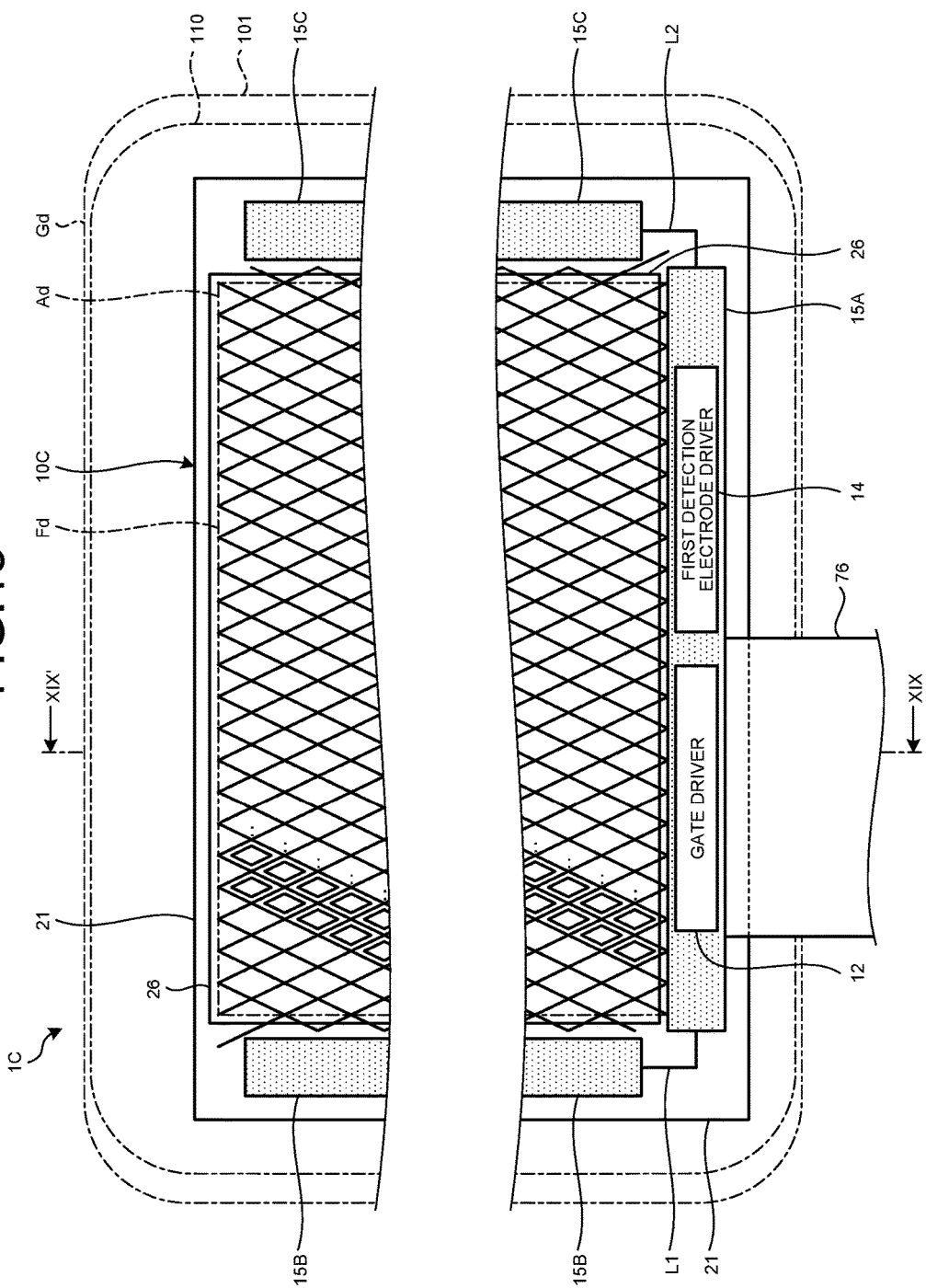
FIG. 18 is a schematic plan view that illustrates a display device according to a third embodiment.
Figure 19:
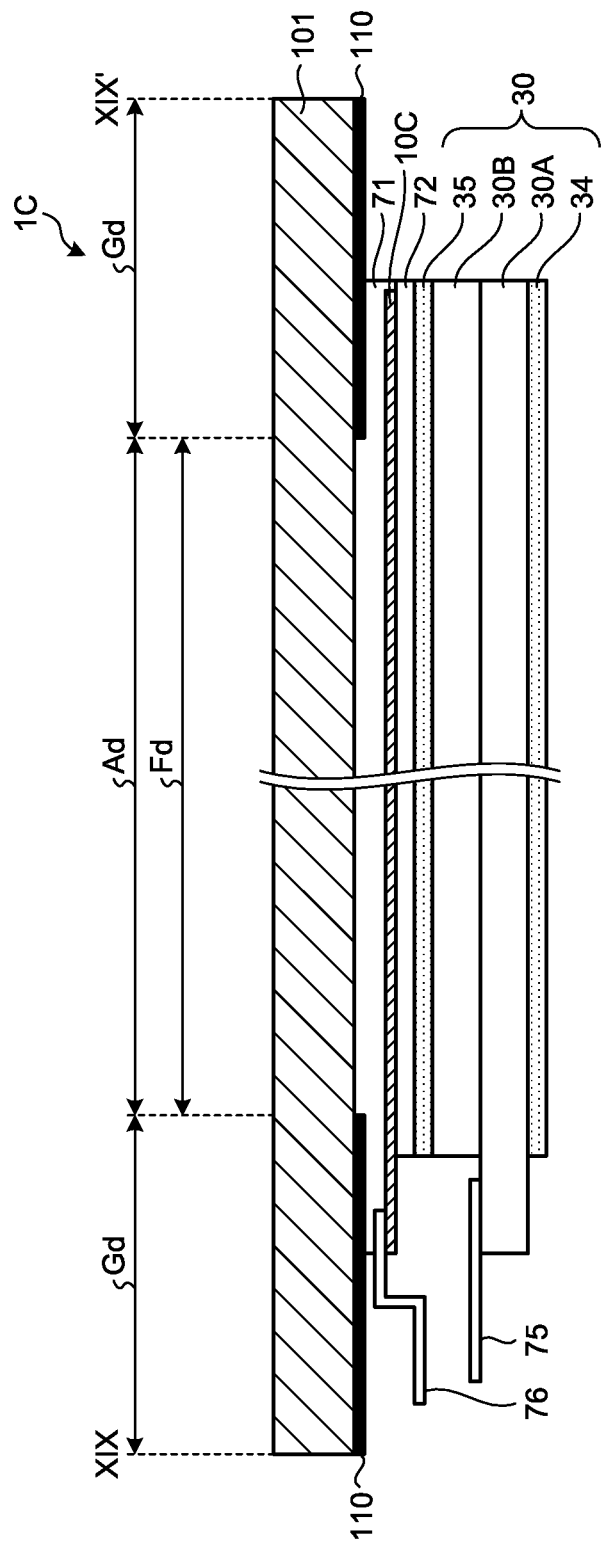
FIG. 19 is a cross-sectional view taken along line XIX-XIX' illustrated in FIG. 18.

FIG. 18 is a schematic plan view that illustrates a display device according to a third embodiment. FIG. 19 is a cross-sectional view taken along line XIX-XIX' illustrated in FIG. 18. As illustrated in FIGS. 18 and 19, in a display device 1C according to this embodiment, a fingerprint sensor 10C is disposed in the whole face of a display area Ad. In other words, the whole face of the display area Ad is a fingerprint detection area Fd.

As illustrated in FIG. 18, first detection electrodes 25 are arranged in the whole face of the display area Ad, and a shield electrode 26 is disposed on the whole face of the display area Ad to face a plurality of the first detection electrodes 25. A sensor base 21 faces the whole face of the display area Ad and is disposed to overlap with the short side and the long side of a frame area Gd. In the sensor base 21, in the short side of the frame area Gd, a circuitry 15A including a gate driver 12 and a first detection electrode driver 14 is disposed, and circuitries 15B and 15C are disposed along the long side of the frame area Gd. On the side of the short side of the frame area Gd, gate lines GCL and signal lines SGL are coupled to the circuitry 15A. In addition, on the side of the long side of the frame area Gd, the gate lines GCL and the signal lines SGL are coupled to the circuitries 15B and 15C.

According to such a configuration, based on the basic principle of the self-capacitance type, the unevenness of a finger or the like being brought into contact with or approaching the whole face of the display area Ad can be detected based on a detection signal Vdet according to a change in the capacitance of the first detection electrode 25. In addition, the position of an external object such as a contacting or approaching finger can be detected by using the first detection electrode 25. Accordingly, it may be configured such that the position of a contacting or approaching finger or the like is detected by using the first detection electrode 25, and a fingerprint detecting operation is performed at the detected position at a fine pitch.

As illustrated in FIG. 19, a fingerprint sensor 10C is disposed to cover the whole face of a polarizing plate 35 of a display panel 30. The fingerprint sensor 10C and the polarizing plate 35 of the display panel 30 are bonded together via an adhesive layer 72, and the fingerprint sensor 10C and a cover member 101 are bonded together via an adhesive layer 71.

In this way, since the fingerprint sensor 10C is disposed to face the whole face of the display area Ad, a difference in the light transmittance in the whole face of the display area Ad is suppressed, and accordingly, the visibility can be improved. The outer periphery of the fingerprint sensor 10C is arranged at a position overlapping with the frame area Gd. For this reason, for example, even in a case where air bubbles are generated between the adhesive layers 71, 72 and the sensor base 21 in the outer periphery of the sensor base 21, the air bubbles are shielded by a decoration layer 110, and accordingly, the air bubbles are suppressed from being visually recognized.

Fourth Embodiment

Figure 20:
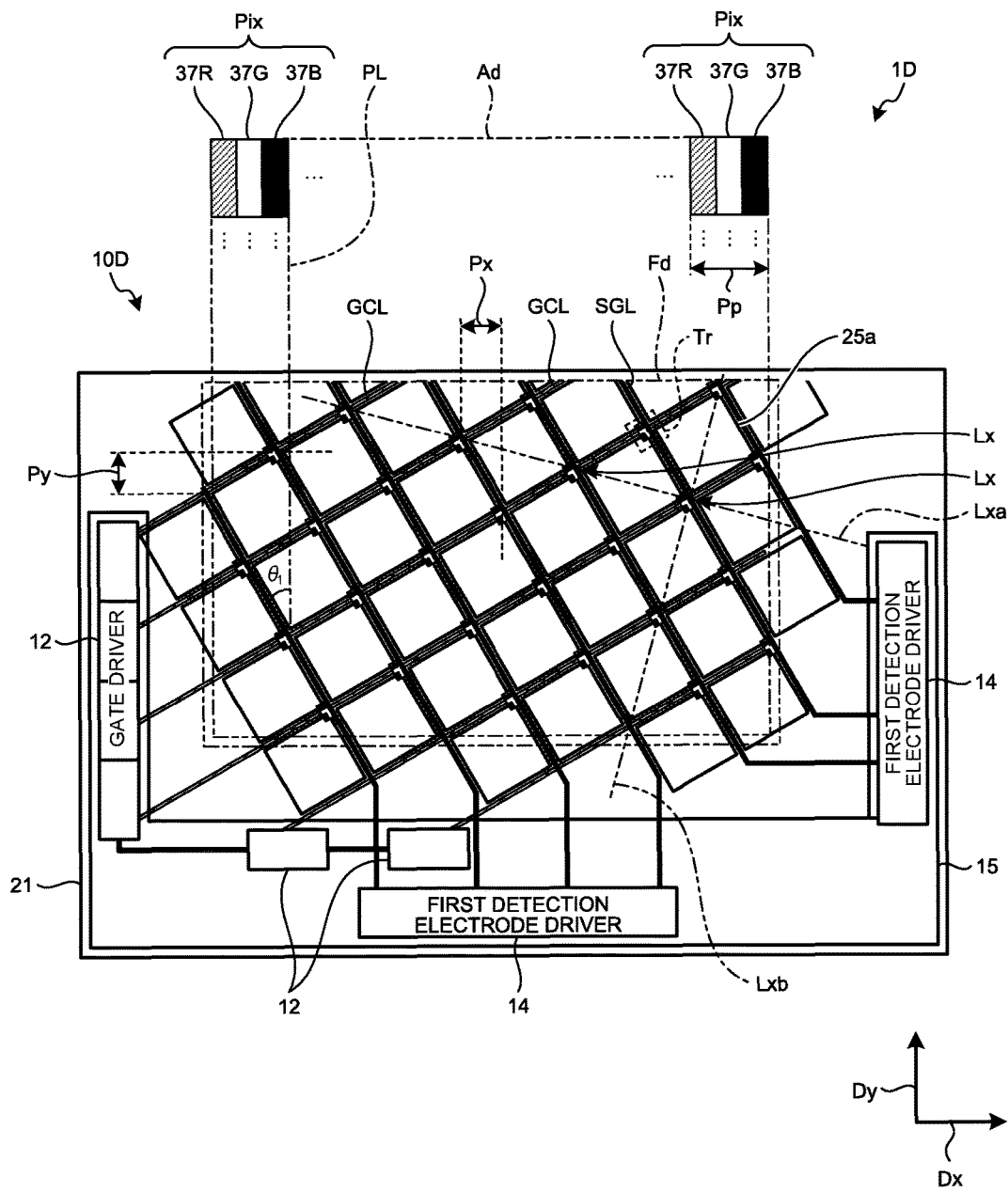
FIG. 20 is a schematic diagram that illustrates a relation between the arrangement of pixels and the arrangement of first detection electrodes of a display device according to a fourth embodiment.

FIG. 20 is a schematic diagram that illustrates a relation between the arrangement of pixels and the arrangement of first detection electrodes of a display device according to a fourth embodiment. In a display area Ad, a plurality of pixels Pix of a display panel 30 are arranged in directions along a first direction Dx (column direction) and a second direction Dy (row direction). In FIG. 20, only a part of the pixels Pix is illustrated.

Each of the pixels Pix is configured by a subpixel corresponding to a red color filer 37R, a subpixel corresponding to a green color filer 37G, and a subpixel corresponding to a blue color filer 37B as one set. The pixel Pix may be a combination of different colors or a combination of four or more colors. As illustrated in FIG. 20, in the first direction Dx, a pitch at which the pixels Pix are repeatedly arranged is denoted as an arrangement pitch Pp. In addition, in the second direction Dy, a direction along an arrangement direction in which the pixels Pix are repeatedly arranged is denoted as a pixel arrangement direction PL.

In a display device 1D according to this embodiment, each of first detection electrodes 25a of a fingerprint sensor 10D has a square shape, and a plurality of the first detection electrodes 25a are arranged in a matrix pattern. As illustrated in FIG. 20, the first detection electrodes 25a are disposed to incline with respect to the pixel arrangement direction PL. Here, an angle formed by one side of the first detection electrode 25a and the pixel arrangement direction PL is assumed to be an angle $\theta_1$. In this embodiment, it is preferable that the angle $\theta_1$ is in a range of 27° to 38°. In such a case, signal lines SGL incline at the angle $\theta_1$ with respect to the pixel arrangement direction PL. Gate lines GCL are orthogonal to the signal lines SGL and incline at an angle (90°−$\theta_1$) with respect to the pixel arrangement direction PL.

In this way, the gate lines GCL and the signal lines SGL are disposed to incline with respect to the pixel arrangement direction PL of the pixels Pix. In this way, the arrangement of intersections Lx between the gate lines GCL and the signal lines SGL deviate from the arrangement of the pixels Pix in the first direction Dx (row direction) and the arrangement of the pixels Pix in the second direction Dy (column direction). As a result, the generation of moire can be suppressed. By setting the angle $\theta_1$ to be in the range of 27° to 38°, the generation of moire can be suppressed more effectively.

In this embodiment, first switching elements Tr and second switching elements Trx described above are disposed in correspondence with the first detection electrodes 25a. In FIG. 20, for the simplification of description, the second switching elements Trx are not illustrated, and, in the description presented below, the description of the second switching elements Trx will not be presented. Also in this embodiment, similarly to the cases illustrated in FIGS. 9 and 11, the first switching elements Tr and the second switching elements Trx are disposed near the intersections Lx between the gate lines GCL and the signal lines SGL.

In an area surrounded by the gate lines GCL and the signal lines SGL, the light transmittance is lower in a portion in which the first switching element Tr is disposed than in a portion in which the first switching element Tr is not disposed. For this reason, due to a relation between the arrangement direction in which the first switching elements Tr are repeatedly arranged and the pixel arrangement direction PL of the pixels Pix, there is a possibility that moire is generated. In addition, due to a relation between the arrangement pitch at which the first switching elements Tr are repeatedly arranged and the arrangement pitch Pp of the pixels Pix, there is a possibility that moire is generated.

As illustrated in FIG. 20, in diagonal directions of the first detection electrodes 25a, directions in which the first switching elements Tr are repeatedly arranged are set as an arrangement direction Lxa and an arrangement direction Lxb. In other words, the arrangement direction Lxa and the arrangement direction Lxb of the first switching elements Tr are directions along the arrangement directions of the intersections Lx.

As described above, the first detection electrodes 25a are disposed to incline at an angle $\theta_1$ with respect to the pixel arrangement direction PL. In this way, the arrangement direction Lxa and the arrangement direction Lxb of the first switching elements Tr incline with respect to the pixel arrangement direction PL of the pixels Pix. For this reason, the generation of moire due to the arrangement direction Lxa and the arrangement direction Lxb of the first switching elements Tr and the pixel arrangement direction PL of the pixels Pix can be suppressed.

As illustrated in FIG. 20, in the first switching elements Tr arranged along one signal line SGL, the arrangement pitch of the first switching elements Tr in the first direction Dx is set as an arrangement pitch Px. In addition, in the first switching elements Tr arranged along one gate line GCL, the arrangement pitch of the first switching elements Tr in the second direction Dy is set as an arrangement pitch Py.

In this embodiment, each of the arrangement pitch Px and the arrangement pitch Py of the first switching elements Tr is a half integer multiple±0.1 times of the arrangement pitch Pp of the pixels Pix. In other words, the arrangement pitch Px and the arrangement pitch Py satisfy a relation of Px, Py=Pp×((n+½)±0.1) (here, n=1, 2, 3, . . . ). More specifically, it is preferable that the arrangement pitch Px and the arrangement pitch Py of the first switching elements Tr are 1.4 times, 1.6 times, 2.4 times, 2.6 times, . . . of the arrangement pitch Pp of the pixels Pix.

In this way, the display device 1D according to this embodiment, by configuring the arrangement pitch Px and the arrangement pitch Py of the first switching elements Tr to be pitches deviating from the arrangement pitch Pp of the pixels Pix, the generation of moire can be suppressed.

Fifth Embodiment

Figure 21:
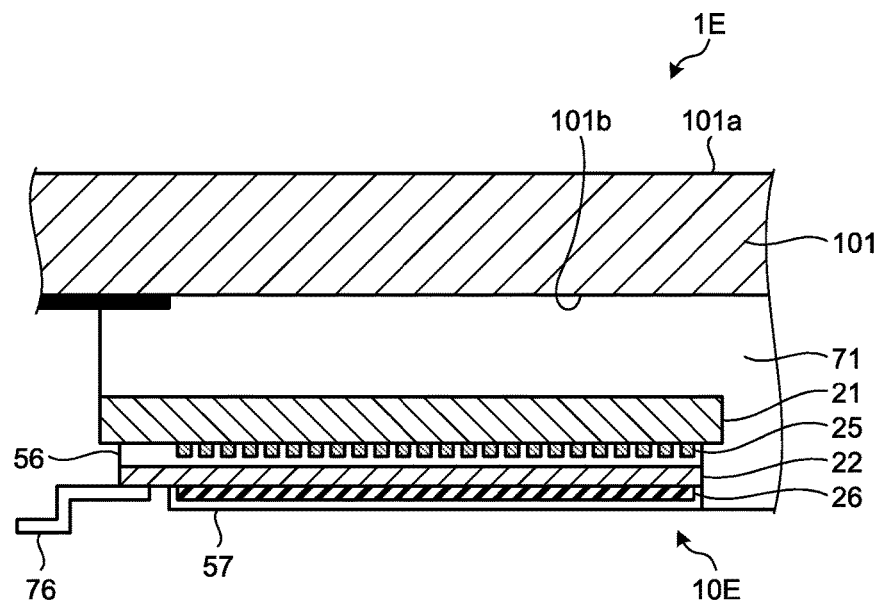
FIG. 21 is a cross-sectional view that partially illustrates a schematic cross-section structure of a display device according to a fifth embodiment.
Figure 22:
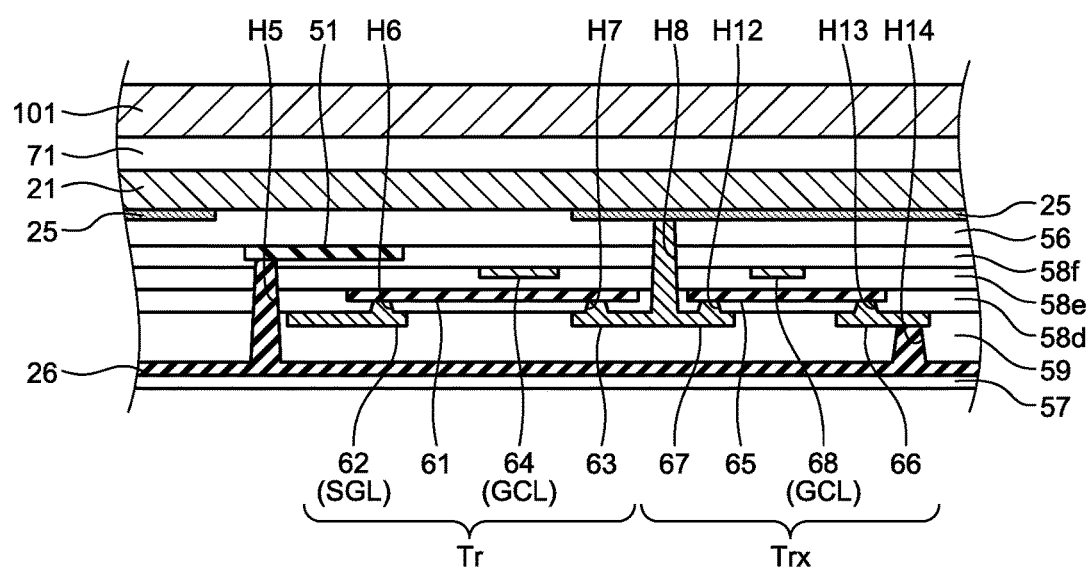
FIG. 22 is a cross-sectional view that illustrates a schematic cross-section structure of a fingerprint sensor according to the fifth embodiment.

FIG. 21 is a cross-sectional view that partially illustrates a schematic cross-section structure of a display device according to a fifth embodiment. FIG. 22 is a cross-sectional view that illustrates a schematic cross-section structure of a fingerprint sensor according to the fifth embodiment. In the first embodiment, as illustrated in FIGS. 2 and 3, the first detection electrode 25, the shield electrode 26, the wiring layer 22, and the sensor base 21 are stacked from the first face 101a side that is a detection face of the cover member 101 in the mentioned order, but the structure is not limited thereto. For example, the sensor base 21 may be arranged on the cover member 101 side.

As illustrated in FIG. 21, in a display device 1E according to this embodiment, a sensor base 21 of a fingerprint sensor 10E is bonded to a second face 101b of a cover member 101 via an adhesive layer 71. In this embodiment, for the cover member 101, the sensor base 21, a first detection electrode 25, a wiring layer 22, and a shield electrode 26 are stacked in the mentioned order. In FIG. 21, while not illustrated, the fingerprint sensor 10E is bonded to a polarizing plate 35 (see FIG. 2) of the display panel 30 via an adhesive layer 72. In this embodiment, the shield electrode 26 faces the polarizing plate 35 through an insulating layer 57 and the adhesive layer 72 (not illustrated in the drawing).

As illustrated in FIG. 22, from the sensor base 21 toward the display panel 30 (not illustrated in the drawing) disposed on the lower side, the first detection electrode 25, a conductive wiring 51, a first switching element Tr, a second switching element Trx, and the shield electrode 26 are stacked in the mentioned order. On the lower side of the sensor base 21, the first detection electrode 25 is disposed. Below the lower side of the first detection electrode 25, the conductive wiring 51 is disposed via an insulating layer 56. Below the lower side of the conductive wiring 51, the gate line GCL (a gate electrode 64 and a gate electrode 68) is disposed via an insulating layer 58f. Below the lower side of the gate line GCL, a semiconductor layer 61 and a semiconductor layer 65 are disposed via an insulating layer 58e. Below the lower side of the semiconductor layer 61 and the semiconductor layer 65, a source electrode 62 (signal line SGL), a drain electrode 63, a drain electrode 67, and a source electrode 66 are disposed through an insulating layer 58d. Below the lower side of the source electrode 62 (signal line SGL), the drain electrode 63, the drain electrode 67, and the source electrode 66, the shield electrode 26 is disposed through a flattening layer 59. An insulating layer 57 is disposed to cover the shield electrode 26. The insulating layer 57 is bonded to the polarizing plate 35 of the display panel 30 via the adhesive layer 72.

The conductive wiring 51 and the shield electrode 26 are coupled through a contact hole H5. In the first switching element Tr, the first detection electrode 25 is coupled to the drain electrode 63 through a contact hole H8. The drain electrode 63 is coupled to one end side of the semiconductor layer 61 through a contact hole H7. The other end side of the semiconductor layer 61 is coupled to the source electrode 62 through a contact hole H6. In this way, the first detection electrode 25 and the first switching element Tr are coupled to each other.

In the second switching element Trx, the semiconductor layer 65 is coupled to the drain electrode 67 through a contact hole H12. The drain electrode 67 is coupled to the first detection electrode 25 through a contact hole H8. The semiconductor layer 65 is coupled to the source electrode 66 through a contact hole H13, and the source electrode 66 is coupled to the shield electrode 26 through a contact hole H14. In this way, the first detection electrode 25 and the second switching element Trx, and the shield electrode 26 and the second switching element Trx are electrically coupled.

Also in this embodiment, a guard signal Vsgl is supplied to the shield electrode 26 through the conductive wiring 51. In addition, by arranging the second switching element Trx, the guard signal Vsgl is supplied to the first detection electrode 25 that has not been selected as a detection target through the shield electrode 26. In this way, parasitic capacitance between the first detection electrode 25 and the shield electrode 26, and parasitic capacitance between the first detection electrode 25 that has been selected as a detection target and the first detection electrodes 25, which have not been selected as the detection target, disposed on the periphery thereof are decreased.

In this embodiment, even in a case where the sensor base 21 is arranged on the first face 101a side that is a detection face of the cover member 101, the first detection electrode 25 is arranged on the first face 101a side with respect to the first switching elements Tr, the second switching element Trx, the gate line GCL, and the signal line SGL. Accordingly, between a contacting or approaching finger or the like and the first detection electrode 25, the first switching element Tr and various wirings are not interposed, and accordingly, the degradation of the detection performance can be suppressed.

(Manufacturing Method)

Figure 23:
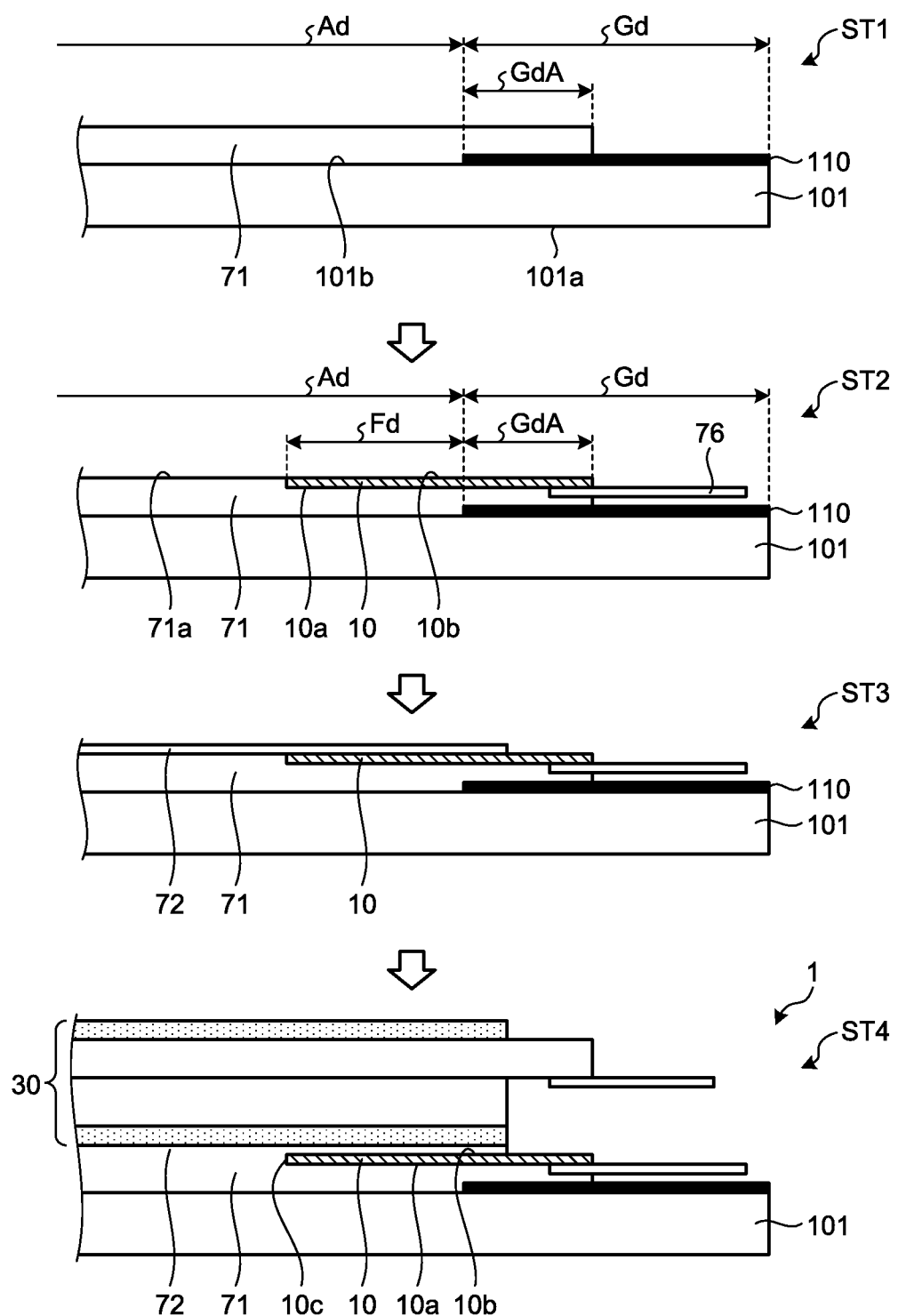
FIG. 23 is a schematic diagram that illustrates an example of the manufacturing process of a display device.

Next, a method of bonding the cover member 101, the fingerprint sensor 10, and the display panel 30 will be described. FIG. 23 is a schematic diagram that illustrates an example of the manufacturing process of a display device. As illustrated in FIG. 23, first, a second face 101b of a cover member 101 is coated with an adhesive layer 71 (step ST1). The whole face of a display area Ad and an overlapping area GdA, which is an area overlapping with a fingerprint sensor 10 in a frame area Gd are coated with the adhesive layer 71. As the material of the adhesive layer 71, for example, an optical clear resin (OCR) that is a UV curing resin of the liquid phase may be used. In the example illustrated in FIG. 23, the adhesive layer 71 is adjusted to have viscosity of a degree for which a fixed shape can be maintained, after coating, before UV curing.

Next, in a fingerprint detection area Fd and an overlapping area GdA, the fingerprint sensor 10 is bonded to the cover member 101 (step ST2). At this time, the adhesive layer 71 is in a liquid phase, and the fingerprint sensor 10 is bonded such that one face 10a of the fingerprint sensor 10 is buried in the adhesive layer 71, and the other face 10b of the fingerprint sensor 10 coincides with a surface 71a of the adhesive layer 71.

Next, coating is performed using an adhesive layer 72 to cover the adhesive layer 71 and the fingerprint sensor 10 (step ST3). The adhesive layer 72 is disposed on the whole face of the display area Ad. As the adhesive layer 72, for example, an optical clear resin (OCR) that is the same as the material of the adhesive layer 71 is used.

Next, the display panel 30 is bonded to the adhesive layer 72 (step ST4). Thereafter, the adhesive layer 71 and the adhesive layer 72 are cured by ultraviolet radiation, and the cover member 101, the fingerprint sensor 10, and the display panel 30 are bonded together. In this way, the display device 1 is manufactured.

In FIG. 2 and the like, while the adhesive layer 71 and the adhesive layer 72 are illustrated to be divided into different layers, as described above, in a case where the same optical clear resins (OCR) are used as the adhesive layer 71 and the adhesive layer 72, as represented in step ST4 illustrated in FIG. 23, the adhesive layer 71 and the adhesive layer 72 are integrated, and a boundary thereof is not visually recognized.

In the case of a configuration in which the fingerprint sensor 10 is arranged in a part of the display area Ad, an end portion 21c (see FIG. 8) of the sensor base 21 and the like of the fingerprint sensor 10 is disposed in the display area Ad. In such a case, in a case where air bubbles are generated on the periphery of the fingerprint sensor 10, there is a possibility that the air bubbles are visually recognized by an observer. In this embodiment, adhesive agents of the liquid phase are used as the adhesive layer 71 and the adhesive layer 72. In this way, in a state in which one face 10a, the other face 10b, and the side face 10c of the fingerprint sensor 10 are in close contact with the adhesive agents of the liquid phase, the adhesive agents are cured, and the fingerprint sensor 10 is in a state of being buried inside the resin layer. For this reason, the generation of air bubbles between the adhesive layer 71 and the fingerprint sensor 10, and between the adhesive layer 72 and the fingerprint sensor 10 can be suppressed.

In FIG. 23, while a process of coating the whole face of the display area Ad with the adhesive layer 71 and the adhesive layer 72 is illustrated, the process is not limited thereto. For example, it may be configured such that a plurality of portions of the display area Ad are coated with the adhesive layer 71 and the adhesive layer 72, and the adhesive layers spread over the whole face of the display area Ad in accordance with the fluidity of the adhesive layer 71 and the adhesive layer 72 when the fingerprint sensor 10 and the display panel 30 are bonded together. The manufacturing method illustrated in FIG. 23 is merely an example, and the sequence of bonding the members and the like may be appropriately changed.

Sixth Embodiment

Figure 24:
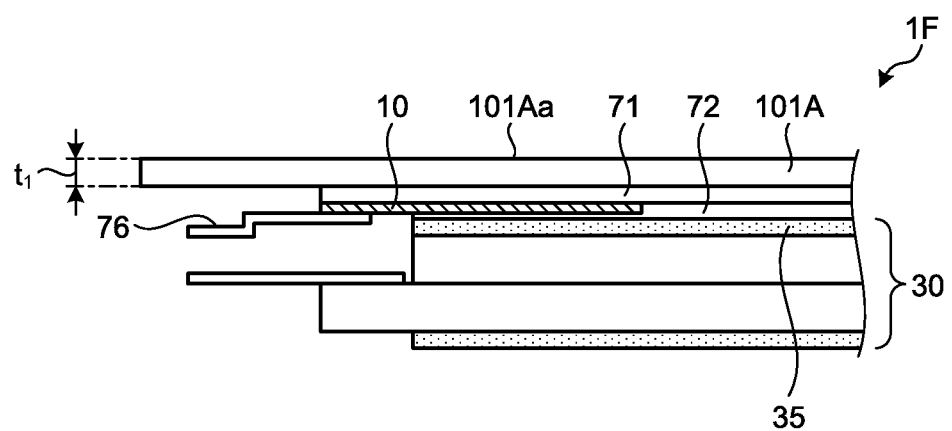
FIG. 24 is a cross-sectional view that illustrates the schematic cross-section structure of a display device according to a sixth embodiment.

FIG. 24 is a cross-sectional view that illustrates the schematic cross-section structure of a display device according to a sixth embodiment. In a display device 1F illustrated in FIG. 24, a thin-type glass substrate is used as a cover member 101A. The thickness $t_1$ of the cover member 101A, for example, is 0.5 mm or less and, more preferably, is 0.3 mm or less. Accordingly, a distance between a first face 101Aa of the cover member 101A and a first detection electrode 25 (not illustrated in FIG. 24) is decreased, and excellent detection sensitivity can be acquired.

In this embodiment, since the thin-type glass substrate is used for the cover member 101A, in the bonding process illustrated in FIG. 23, there is a possibility that the cover member 101A is damaged. In such a case, a display panel 30 is coated with an adhesive layer 72, and the fingerprint sensor 10 is bonded to be buried in the adhesive layer 72. Thereafter, it may be configured such that coating is performed using the adhesive layer 71 to cover the adhesive layer 72 and the fingerprint sensor 10, and the cover member 101A may be bonded thereto.

Seventh Embodiment

Figure 25:
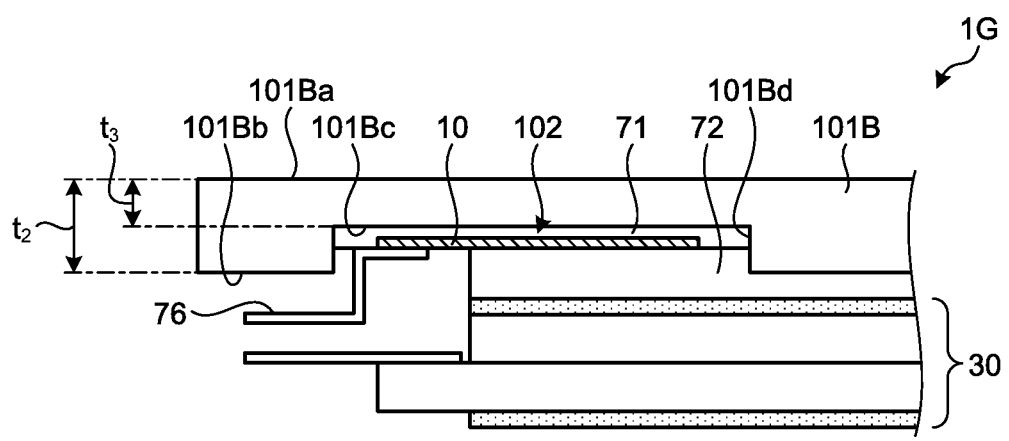
FIG. 25 is a cross-sectional view that illustrates the schematic cross-section structure of a display device according to a seventh embodiment.

FIG. 25 is a cross-sectional view that illustrates the schematic cross-section structure of a display device according to a seventh embodiment. In the display device 1G according to this embodiment, a concave part 102 is disposed in a cover member 101B. The concave part 102 is concaved from a second face 101Bb of the cover member 101B to a first face 101Ba side and is disposed at least at a part overlapping with a fingerprint sensor 10. The planar shape of the concave part 102 is larger than the external shape of the fingerprint sensor 10, and the fingerprint sensor 10 is disposed inside the concave part 102. The inside of the concave part 102 is coated with an adhesive layer 71, and the fingerprint sensor 10 is bonded to an upper face 101Bc of the concave part 102 to be buried in the adhesive layer 71. A first face 101Ba of a cover member 101B is configured as a flat face.

An adhesive layer 72 is disposed to cover parts of the adhesive layer 71 and the fingerprint sensor 10 disposed in the concave part 102. In addition, the adhesive layer 72 is disposed in a cover member 101B of a part in which the concave part 102 is not disposed. A display panel 30, in a part in which the concave part 102 is disposed, is bonded to the cover member 101B via the adhesive layer 71 and the adhesive layer 72 and, in a part in which the concave part 102 is not disposed, is bonded to the cover member 101B via the adhesive layer 72.

In this embodiment, in the part in which the concave part 102 is disposed, the thickness of the cover member 101B is small, and the fingerprint sensor 10 is disposed in this concave part 102. For example, the thickness $t_3$ of the cover member 101B of the part in which the concave part 102 is disposed may be configured to be a half of or less than the thickness $t_2$ of the cover member 101B of the part in which the concave part 102 is not disposed. For example, the thickness $t_3$ of the cover member 101B of the part in which the concave part 102 is disposed is 0.5 mm or less and, more preferably, is 0.3 mm or less.

According to such a configuration, a distance between the first face 101Ba of the cover member 101B and a first detection electrode 25 (not illustrated in FIG. 24) is shortened, and excellent detection sensitivity can be acquired. In addition, in the part in which the concave part 102 is not formed, since the cover member 101B can be configured to be thick, the detection sensitivity can be improved with the strength of the cover member 101B maintained.

Furthermore, by using the optical clear resins described above as the adhesive layer 71 and the adhesive layer 72, the adhesive layer 71 and the adhesive layer 72 can be easily disposed inside the concave part 102, and, by bringing the upper face 101Bc and a side face 101Bd of the concave part 102 into close contact with the adhesive layer 71, the generation of air bubbles can be suppressed.

Eighth Embodiment

Figure 26:
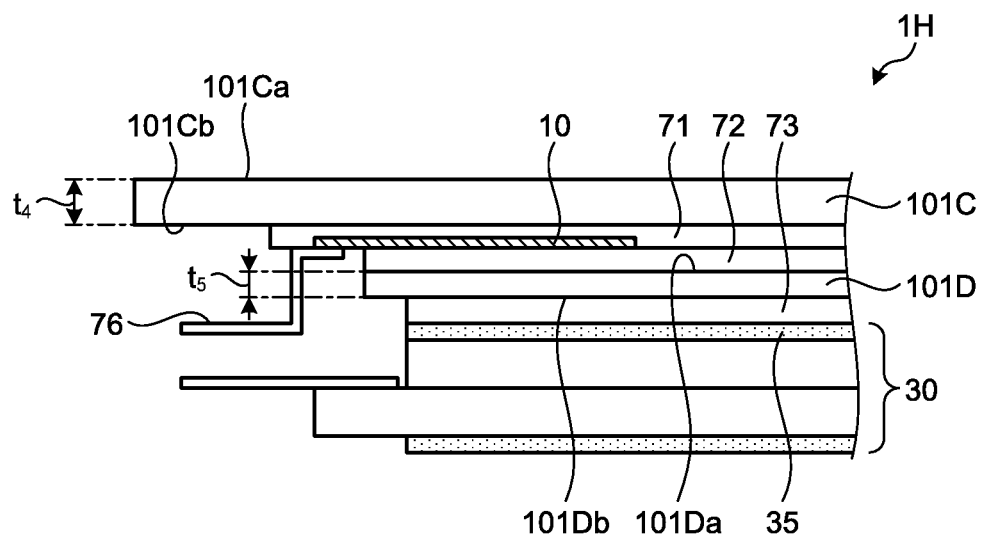
FIG. 26 is a cross-sectional view that illustrates the schematic cross-section structure of a display device according to an eighth embodiment.

FIG. 26 is a cross-sectional view that illustrates the schematic cross-section structure of a display device according to an eighth embodiment. In a display device 1H according to this embodiment, a support substrate 101D is disposed to face a cover member 101C. A fingerprint sensor 10, in a direction perpendicular to a first face 101Ca of the cover member 101C, is arranged between the cover member 101C and the support substrate 101D. The fingerprint sensor 10 is bonded to a second face 101Cb of the cover member 101C via an adhesive layer 71. In addition, the fingerprint sensor 10 is bonded to a first face 101Da of the support substrate 101D via an adhesive layer 72. A display panel 30 is bonded to a second face 101Db of the support substrate 101D via an adhesive layer 73.

The thickness $t_4$ of the cover member 101C may be different from or the same as the thickness $t_5$ of the support substrate 101D. In this embodiment, the support substrate 101D is disposed, and the cover member 101C and the support substrate 101D are formed in a so-called laminated glass shape. As a result, even in a case where the thickness $t_4$ of the cover member 101C is thinly formed to be 0.5 mm or less, the strength of the cover member 101C can be maintained. Accordingly, the display device 1H according to this embodiment can improve the detection sensitivity of the fingerprint sensor 10 while the strength of the cover member 101C is maintained.

Ninth Embodiment

Figure 27:
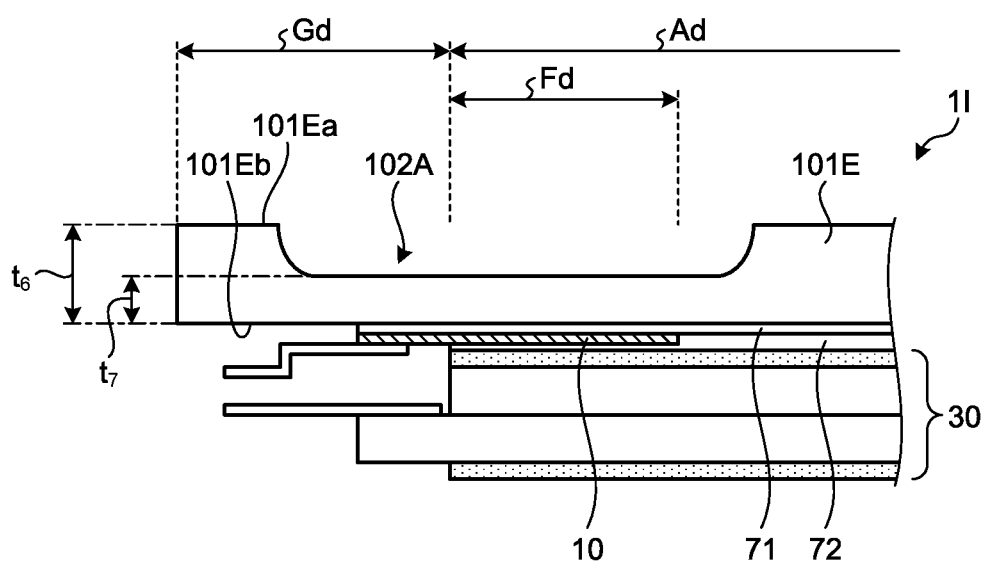
FIG. 27 is a cross-sectional view that illustrates the schematic cross-section structure of a display device according to a ninth embodiment.

FIG. 27 is a cross-sectional view that illustrates the schematic cross-section structure of a display device according to a ninth embodiment. In the display device 1I according to this embodiment, a concave part 102A is disposed in a cover member 101E. The concave part 102A is concaved from a first face 101Ea of the cover member 101E to a second face 101Eb side and is disposed at least in a portion overlapping with a fingerprint detection area Fd. In the example illustrated in FIG. 27, the concave part 102A is disposed in an area overlapping with the fingerprint sensor 10. The second face 101Eb of the cover member 101E to which the fingerprint sensor 10 is bonded is configured as a flat face.

Also in this embodiment, in a part in which the concave part 102A is disposed, the thickness of the cover member 101E is configured to be small, and, at a position overlapping with this concave part 102A, the fingerprint sensor 10 is disposed on a second face 101Eb of the cover member 101E. For this reason, a distance between the first face 101Ea of the cover member 101E and the first detection electrode 25 (not illustrated in FIG. 27) is shortened, and excellent detection sensitivity can be acquired. For example, the thickness $t_7$ of the cover member 101E of the part in which the concave part 102A is disposed may be configured to be a half of or less than the thickness $t_6$ of the cover member 101E of the part in which the concave part 102A is not disposed. For example, the thickness $t_7$ of the cover member 101E of the part in which the concave part 102A is disposed is 0.5 mm or less and, more preferably, is 0.3 mm or less. In the part in which the concave part 102A is not formed, since the cover member 101E can be thickened, the detection sensitivity can be improved while the strength of the cover member 101E is maintained.

In this embodiment, on the first face 101Ea of the cover member 101E that is a detection face, the concave part 102A is disposed. Accordingly, an observer can recognize the fingerprint detection area Fd by using the sense of touch of a finger. Therefore, the display device 1I according to this embodiment can realize excellent operability.

Tenth Embodiment

Figure 28:
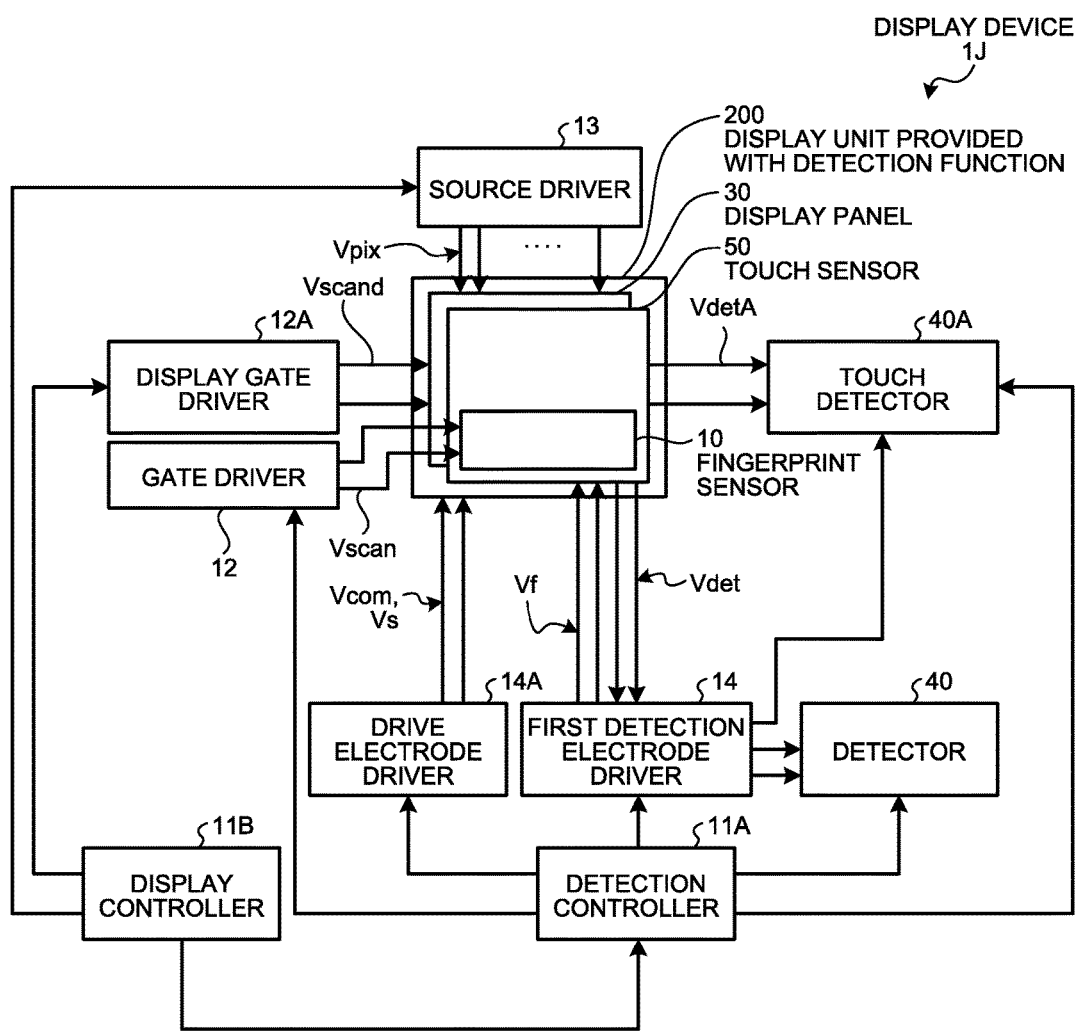
FIG. 28 is a block diagram that illustrates an example of the configuration of a display device according to a tenth embodiment.

FIG. 28 is a block diagram that illustrates an example of the configuration of a display device according to a tenth embodiment. As illustrated in FIG. 28, a display device 1J includes a display unit 200 provided with a detection function, a fingerprint sensor 10, a detection controller 11A, a display controller 11B, a gate driver 12, a display gate driver 12A, a source driver 13, a first detection electrode driver 14, a drive electrode driver 14A, a detector 40, and a touch detector 40A. The display device 1J is a display device in which the display unit 200 provided with a detection function has a built-in detection function.

The display unit 200 provided with a detection function is a device acquired by integrating the display panel 30 described above and a touch sensor 50 that is a detection device detecting a touch input. The device acquired by integrating the display panel 30 and the touch sensor 50 represents that, for example, a part of substrates or electrodes used by the display panel 30 or the touch sensor 50 are commonly used. The display panel 30, for example, may be an organic EL display panel.

The display controller 11B is a circuit that mainly controls a display operation by supplying control signals to the display gate driver 12A and the source driver 13 based on a video signal supplied from the outside. In addition, the display controller 11B can perform control such that the display gate driver 12A, the source driver 13, and the detection controller 11A operate with being synchronized with each other or without being synchronized by further supplying a control signal to the detection controller 11A.

The display gate driver 12A has a function for sequentially selecting one horizontal line that is a target for display driving of the display unit 200 provided with a detection function by outputting a scan signal Vscand for display based on a control signal supplied from the display controller 11B.

The source driver 13 is a circuit that supplies a pixel signal Vpix to each pixel Pix of the display unit 200 provided with a detection function based on a control signal supplied from the display controller 11B. The display controller 11B may be configured to generate a pixel signal Vpix and supply this pixel signal Vpix to the source driver 13.

The touch sensor 50 performs a touch detecting operation based on the basic principle of touch detection of the capacitance type and detects the position of a contacting or approaching external object. In a case where a contact or approach of an external object is detected, the touch sensor 50 outputs a detection signal VdetA to the touch detector 40A.

The detection controller 11A is a circuit that controls a detection operation detecting a contacting or approaching external object that is performed by the touch sensor 50 and controls a detection operation performed by the fingerprint sensor 10. The drive electrode driver 14A is a circuit that supplies a drive signal Vs for detection or a drive signal Vcom for display to a drive electrode 33A of the display unit 200 provided with a detection function based on a control signal supplied from the detection controller 11A. The gate driver 12, as described above, supplies a scan signal Vscan to the fingerprint sensor 10 based on a control signal supplied from the detection controller 11A. In addition, the first detection electrode driver 14 supplies a drive signal Vf to the fingerprint sensor 10 based on a control signal supplied from the detection controller 11A.

Figure 35:
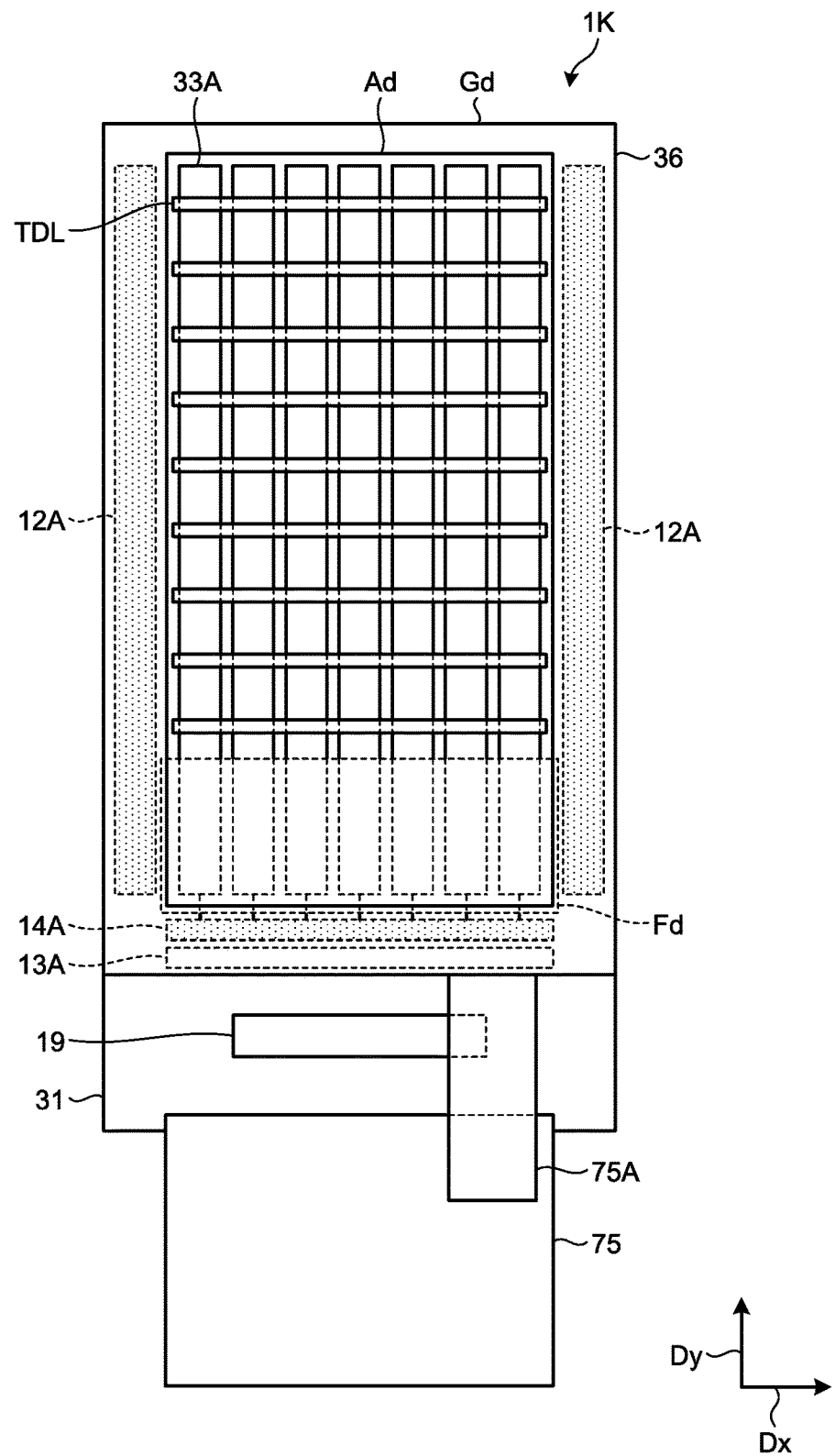
FIG. 35 is a schematic plan view of a display unit provided with a detection function according to a first modification of the tenth embodiment.

The touch detector 40A is a circuit that detects the presence/absence of a touch for the touch sensor 50 based on a control signal supplied from the detection controller 11A and a detection signal VdetA output from the second detection electrode TDL (see FIG. 35). In addition, the touch detector 40A requests coordinates at which a touch is input and the like in a case where the touch is present. The touch detector 40A, similarly to the detector 40 described above, includes a detection signal amplifier, an A/D converter, a signal processor, a coordinate extractor, a detection timing controller, and the like.

Figure 29:
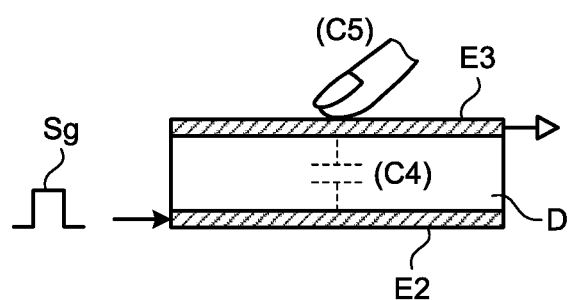
FIG. 29 is a schematic diagram that illustrates a basic principle of touch detection of a mutual capacitance type.
Figure 30:
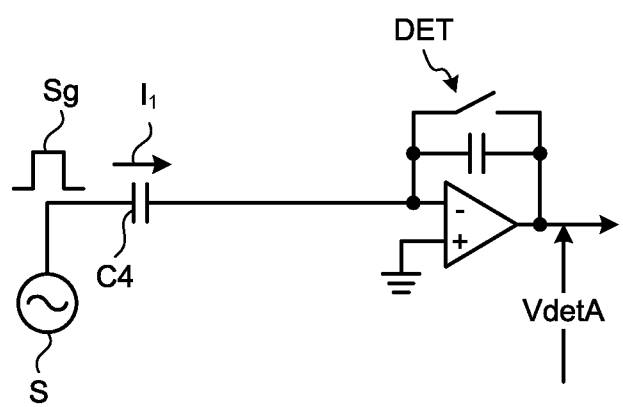
FIG. 30 is a schematic diagram that illustrates an example of an equivalent circuit for describing the basic principle of touch detection of the mutual capacitance type.
Figure 31:
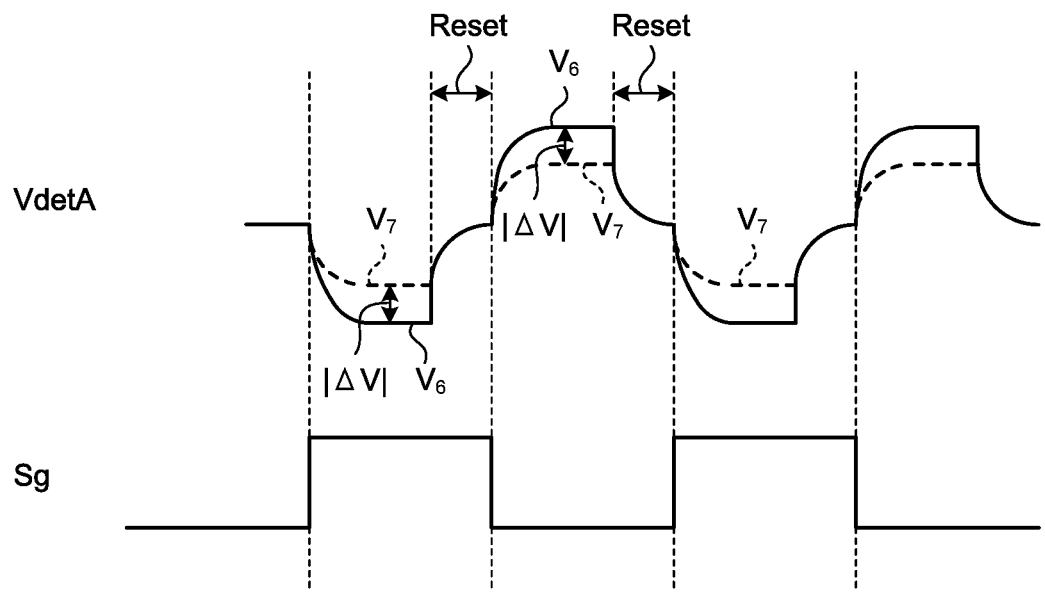
FIG. 31 is a diagram that illustrates an example of the waveforms of a drive signal and a detection signal of touch detection of the mutual-capacitance type.

The touch sensor 50 operates based on the basic principle of touch detection of the capacitance type. Here, the basic principle of touch detection according to a mutual-capacitance type in the display device 1J according to this embodiment will be described with reference to FIGS. 29 to 31. FIG. 29 is a schematic diagram that illustrates the basic principle of touch detection of the mutual capacitance type. FIG. 30 is a schematic diagram that illustrates an example of an equivalent circuit for describing the basic principle of touch detection of the mutual capacitance type. FIG. 31 is a diagram that illustrates an example of the waveforms of a drive signal and a detection signal of touch detection of the mutual-capacitance type. In the description presented below, while a case where a finger is in contact or approaches will be described, the object is not limited to the finger, but the object may be an object including a conductor such as a stylus pen.

For example, as illustrated in FIG. 29, a capacitor C4 includes one pair of electrodes, which are a drive electrode E2 and a detection electrode E3, arranged to face each other with a dielectric D interposed therebetween. In the capacitor C4, in addition to lines of electric force (not illustrated in the drawing) generated between facing faces of the drive electrode E2 and the detection electrode E3, lines of electric force corresponding to a fringe part extending from an end portion of the drive electrode E2 toward the upper face of the detection electrode E3 are generated. As illustrated in FIG. 30, the capacitor C4 has one end coupled to an AC signal source (drive signal source) S and the other end coupled to a voltage detector DET. The voltage detector DET, for example, is an integrating circuit included in the touch detector 40A illustrated in FIG. 28.

When an AC rectangular wave Sg of a predetermined frequency (for example, about several kHz to several hundreds of kHz) is applied from the AC signal source S to the drive electrode E2 (one end of the capacitor C4), an output waveform (detection signal VdetA) as illustrated in FIG. 31 appears through the voltage detector DET coupled to the detection electrode E3 (the other end of the capacitor C4) side. This AC rectangular wave Sg corresponds to a drive signal Vs that is input from the drive electrode driver 14A.

In a state (non-contact state) in which a finger is not in contact or does not approach, a current according to the capacitance value of the capacitor C4 flows according to charging/discharging of the capacitor C4. The voltage detector DET illustrated in FIG. 30 converts a change in the current according to the AC rectangular wave Sg into a change (a waveform $V_6$ (see FIG. 31) of a solid line) in the voltage.

On the other hand, in a state (contact state) in which a finger is in contact or approaches, as illustrated in FIG. 29, capacitance C5 generated by the finger is in contact with or approaches the detection electrode E3. Accordingly, the lines of electric force corresponding to the fringe part between the drive electrode E2 and the detection electrode E3 are blocked by a conductor (finger). For this reason, the capacitor C4 operates as a capacitor having a capacitance value smaller than that of the non-contact state. Then, as illustrated in FIGS. 30 and 31, the voltage detector DET converts a change in a current $I_1$ according to the AC rectangular wave Sg into a change (a waveform $V_7$ of a dotted line) in the voltage.

In this case, a waveform $V_7$ has amplitude smaller than that of the waveform $V_6$ described above. In this way, the absolute value $|\Delta V|$ of a voltage difference between the waveform $V_6$ and the waveform $V_7$ changes according to the influence of an external object such as a finger contacting or approaching from the outside. In addition, in order to detect with accuracy the absolute value $|\Delta V|$ of the voltage difference between the waveform $V_6$ and the waveform $V_7$, the voltage detector DET more preferably performs an operation in which a period Reset for resetting the charging/discharging of a capacitor is arranged according to the frequency of the AC rectangular wave Sg through switching inside the circuit.

The touch detector 40A compares the absolute value $|\Delta V|$ with a predetermined threshold voltage. In a case where this absolute value $|\Delta V|$ is less than a threshold voltage, the touch detector 40A determines that the external approaching object is in the non-contact state. On the other hand, in a case where the absolute value $|\Delta V|$ is the threshold voltage or more, the touch detector 40A determines that the external approaching object is in the contact state. In this way, the touch detector 40A can detect a touch.

Figure 32:
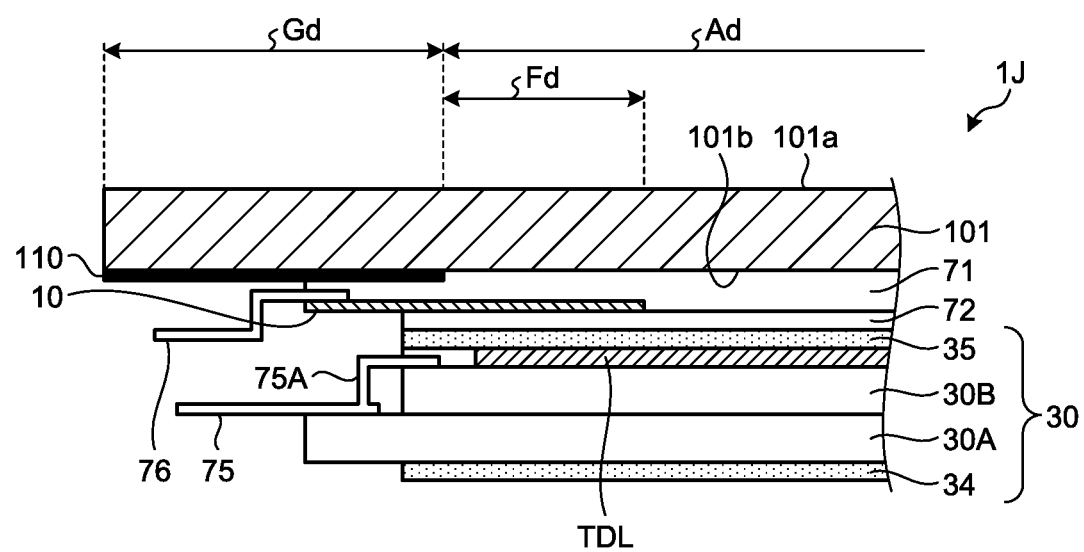
FIG. 32 is a cross-sectional view that illustrates a schematic cross-section structure of the display device according to the tenth embodiment.
Figure 33:
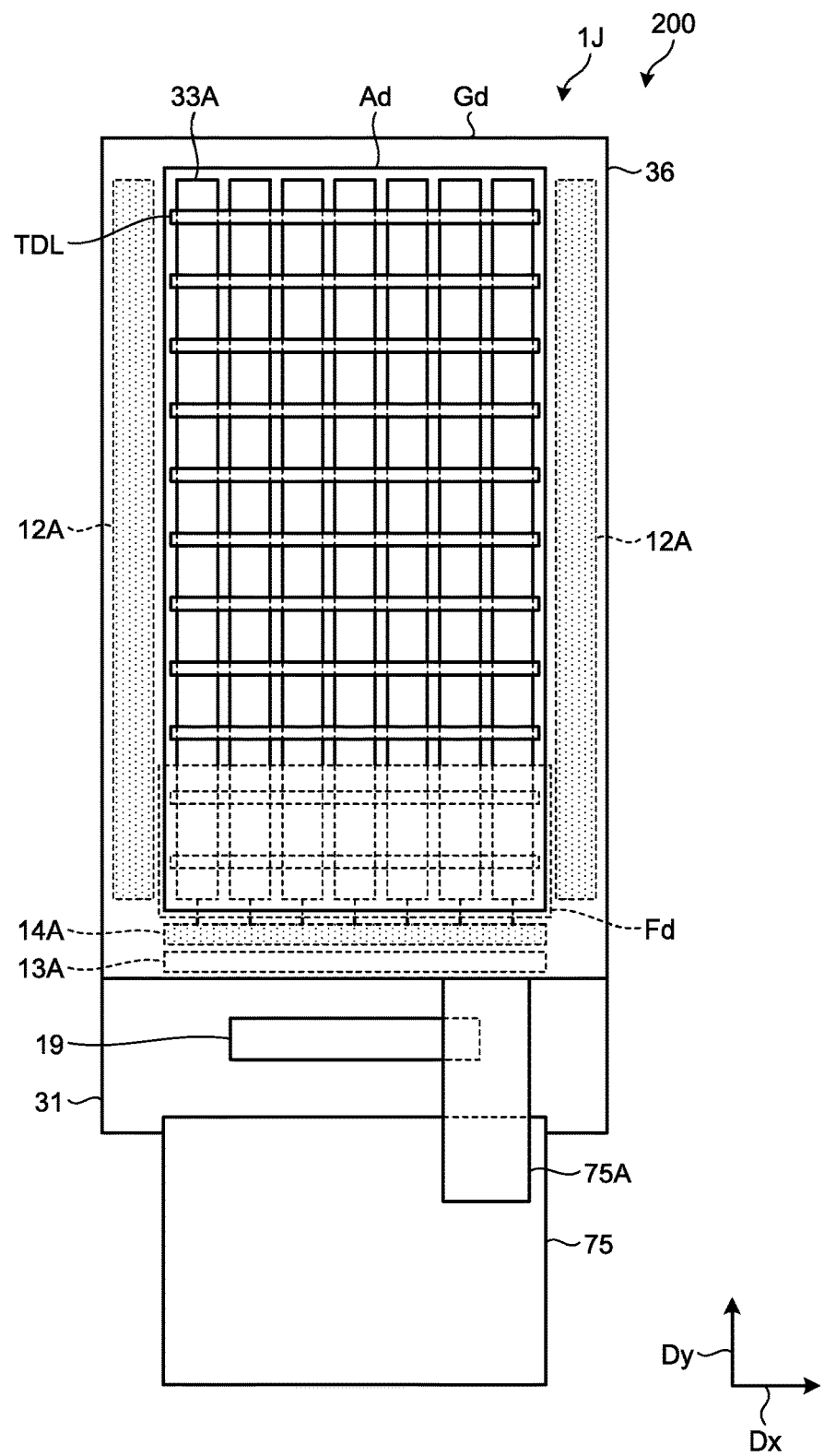
FIG. 33 is a schematic plan view that illustrates a relation between a drive electrode and a second detection electrode according to this embodiment.

Next, an example of the configuration of the display device 1J according to this embodiment will be described. FIG. 32 is a cross-sectional view that illustrates a schematic cross-section structure of the display device according to the tenth embodiment. FIG. 33 is a schematic plan view that illustrates a relation between the drive electrode and the second detection electrode according to this embodiment.

As illustrated in FIG. 32, the display device 1J according to this embodiment includes a cover member 101, a fingerprint sensor 10, and a display panel 30. In this embodiment, a second detection electrode TDL is disposed on a counter substrate 30B of the display panel 30, and the second detection electrode TDL functions as a detection electrode of the touch sensor 50. On the upper side of the second detection electrode TDL, a polarizing plate 35 is disposed.

The fingerprint sensor 10, when viewed from a direction perpendicular to the first face 101a of the cover member 101, is arranged to overlap with the fingerprint detection area Fd disposed in a part of the display area Ad. The fingerprint sensor 10, between the cover member 101 and the display panel 30, is bonded to the upper side of the polarizing plate 35 via the adhesive layer 72 and is bonded to the lower side of the cover member 101 via the adhesive layer 71. The cover member 101, in a part not overlapping with the fingerprint sensor 10, is bonded to the polarizing plate 35 of the display panel 30 via the adhesive layers 71 and 72. In addition, in the example illustrated in FIG. 32, the fingerprint sensor 10 is arranged to overlap with a part of the second detection electrode TDL.

The fingerprint sensor 10 may employ any one of the configurations of the fingerprint sensors 10, 10A, 10B, 10D, and 10E illustrated in the embodiments described above. In addition, the cover member 101 may employ any one of the configurations of the cover members 101, 101A, 101B, 101C, and 101E illustrated in the first embodiment and the sixth to ninth embodiments.

As illustrated in FIG. 33, the display unit 200 provided with a detection function includes drive electrodes 33A disposed on the first substrate 31 and second detection electrodes TDL disposed on the second substrate 36. Each of the drive electrodes 33A is disposed along a second direction Dy in the display area Ad, and a plurality of the drive electrodes 33A are arranged in a first direction Dx. At the time of performing a display operation, the drive electrode 33A is supplied with a drive signal Vcom for display from the drive electrode driver 14A and functions as a common electrode for a plurality of pixel electrodes 32 (see FIG. 4).

Each of the second detection electrodes TDL is disposed along the first direction Dx in the display area Ad, and a plurality of the second detection electrodes TDL are arranged in the second direction Dy. In other words, the second detection electrodes TDL are disposed to intersect with the drive electrodes 33A in the planar view. Each of the second detection electrodes TDL is coupled to a flexible substrate 75A disposed on the side of the short side of the frame area Gd of the second substrate 36 through a frame wiring (not illustrated in FIG. 33). In this embodiment, as the material of the second detection electrode TDL, a conductive material having a light transmitting property such as ITO is used. As illustrated in FIG. 33, the drive electrodes 33A and the second detection electrodes TDL are disposed to overlap with the fingerprint detection area Fd disposed in a part of the display area Ad.

At each of intersections between the second detection electrode TDL and the drive electrodes 33A, capacitance is generated. In the touch sensor 50, when a touch detecting operation of the mutual capacitance type is performed, the drive electrode driver 14A sequentially selects the drive electrodes 33A in a time divisional manner and supplies a drive signal Vs to the selected drive electrode 33A. Then, as the detection signal VdetA is output from the second detection electrode TDL, touch detection can be performed. In other words, the drive electrode 33A corresponds to the drive electrode E2 according to the basic principle of touch detection of the mutual capacitance type described above, and the second detection electrode TDL corresponds to the detection electrode E3. The drive electrode driver 14A may be configured to sequentially select and drive each drive electrode block including a plurality of drive electrodes 33A.

In this way, in this embodiment, the drive electrode 33A functions as a common electrode for a plurality of pixel electrodes 32 at the time of performing a display operation. In addition, the drive electrode 33A functions as a drive electrode for the second detection electrode TDL at the time of performing a detection operation.

In the case illustrated in FIG. 33, in the frame area Gd of the first substrate 31, various circuits such as a display gate driver 12A, a drive electrode driver 14A, and a multiplexer 13A are disposed. However, the configuration is not limited thereto, but a part of the functions of the display gate driver 12A and the drive electrode driver 14A may be included in the display IC 19.

Figure 34:
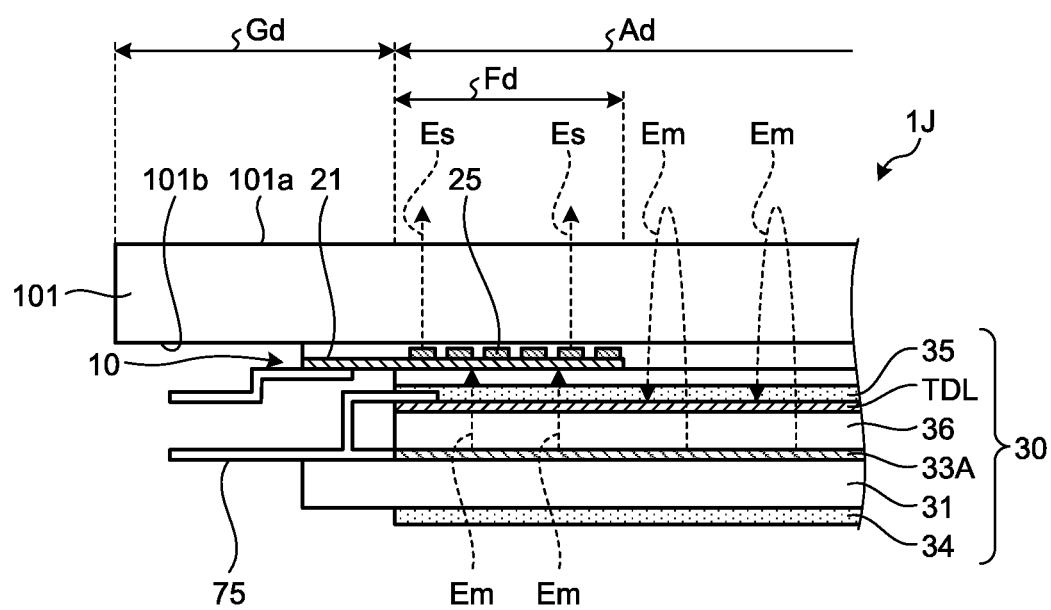
FIG. 34 is a schematic diagram that illustrates a touch detecting operation according to this embodiment.

FIG. 34 is a schematic diagram that illustrates a touch detecting operation according to this embodiment. As illustrated in FIG. 34, a part of the second detection electrode TDL overlaps with the fingerprint sensor 10 and, in a direction perpendicular to the first face 101a of the cover member 101, is arranged at a position located farther than the fingerprint sensor 10 with respect to the cover member 101.

At the time of performing a touch detecting operation, by supplying the drive signal Vs to the drive electrode 33A, a fringe electric field is generated between the second detection electrode TDL and the drive electrode 33A. The lines Em of electric force of the fringe electric field, in an area of the display area Ad that does not overlap with the fingerprint detection area Fd, arrive up to the upper side of the first face 101a of the cover member 101. In this way, based on the basic principle of touch detection of the mutual capacitance type described above, the position of an external object such as a finger that is brought into contact with or approaching the first face 101a of the cover member 101 can be detected.

In the fingerprint detection area Fd, there are cases where the lines Em of electric force of the fringe electric field are blocked by the first detection electrode 25 and the shield electrode 26 (not illustrated in the drawing) of the fingerprint sensor 10 and cannot arrive up to the upper side of the first face 101a of the cover member 101. For this reason, in the touch sensor 50, there is a possibility that the detection sensitivity of touch detection in the fingerprint detection area Fd is degraded, or touch detection cannot be performed.

In this embodiment, the first detection electrode 25 of the fingerprint sensor 10 is used as a detection electrode in a touch detecting operation. In other words, as the drive signal Vf is supplied to the first detection electrode 25, the lines Es of electric force of the electric field extending from the first detection electrode 25 to the upper side are generated. The lines Es of electric force arrive to a further upper side than the first face 101a of the cover member 101 in the fingerprint detection area Fd. In this way, based on the basic principle of touch detection of the self-capacitance type described above, the position of an external object such as a finger brought into contact with or approaching the fingerprint detection area Fd can be detected.

The detection controller 11A (see FIG. 28), in an area of the display area Ad that does not overlap with the fingerprint detection area Fd, performs a touch detecting operation according to the mutual capacitance type of the touch sensor 50 and performs a touch detecting operation of the fingerprint sensor 10 in the fingerprint detection area Fd. The touch detector 40A (see FIG. 28), based on the detection signal VdetA output from the second detection electrode TDL, performs touch detection for an area of the display area Ad that does not overlap with the fingerprint detection area Fd. In addition, the touch detector 40A, based on the detection signal Vdet output from the first detection electrode 25, performs touch detection for the fingerprint detection area Fd. In this way, touch detection for the whole face of the display area Ad can be performed. As above, the fingerprint sensor 10 can perform the touch detection to complement the touch detecting operation of the touch sensor 50.

At this time, the fingerprint sensor 10 may only detect a touch without detecting a fingerprint. Accordingly, as the driving of the fingerprint sensor 10, not the driving for the fingerprint detection but another driving, for example, a method of simultaneously driving a plurality of the first detection electrodes 25 may be employed. In addition, as another driving method, a method of driving not all the first detection electrodes 25 but only the first detection electrodes 25 located at several important positions may be employed. In this way, driving for shortening the detection process of the fingerprint sensor 10 may be employed. In addition, among the second detection electrodes TDL, the second detection electrodes TDL overlapping with the fingerprint detection area Fd may be configured as dummy electrodes not functioning as detection electrodes.

The detection controller 11A may perform a touch detecting operation of the touch sensor 50 and the touch detecting operation of the fingerprint sensor 10 simultaneously or at different timings. In addition, in a case where the fingerprint sensor 10 detects a contacting or approaching finger or the like in the fingerprint detection area Fd, the detection controller 11A may perform fingerprint detection by switching from the touch detecting operation of the fingerprint sensor 10 to the fingerprint detecting operation. In such a case, the fingerprint sensor 10, based on the positional information of the contacting or approaching finger or the like detected by the touch detecting operation, can perform a fingerprint detecting operation by driving the first detection electrode 25 located at a position overlapping with the contacting or approaching finger or the like.

As described above, a plurality of the first detection electrodes 25 are arranged at a pitch corresponding to the arrangement pitch Pp of the pixels Pix, for example, at a pitch of a half integer multiple (including a margin of ±0.1 times) of the arrangement pitch Pp. In the touch detecting operation, the detection resolution may be lower than that of the fingerprint detection. In such a case, the fingerprint sensor 10 may perform a touch detecting operation for each detection electrode block by driving a plurality of first detection electrodes 25 together.

For example, the gate driver 12 simultaneously selects a plurality of gate lines GCL, and the first detection electrode driver 14 supplies the drive signal Vf to a plurality of first detection electrodes 25 (detection electrode block) corresponding to a plurality of selected gate lines GCL. A detection signal Vdet according to a change in the capacitance of the plurality of first detection electrodes 25 (detection electrode block) is output to the touch detector 40A. In this way, by performing the touch detection for each detection electrode block, a time required for detecting a touch can be shortened, and the load of the calculation process in the touch detector 40A can be reduced.

In this embodiment, the shapes or the arrangements of the drive electrodes 33A and the second detection electrodes TDL illustrated in FIG. 33 may be appropriately changed. For example, it may be configured such that each of the drive electrodes 33A is disposed along the first direction Dx, a plurality of the drive electrodes 33A are arranged in the second direction Dy, each of the second detection electrodes TDL is disposed along the second direction Dy, and a plurality of the second detection electrodes TDL are arranged in the first direction Dx.

(First Modification)

FIG. 35 is a schematic plan view of a display unit provided with a detection function according to a first modification of the tenth embodiment. As illustrated in FIG. 35, in the display device 1K according to this modification, there is a difference that the second detection electrodes TDL are disposed in an area of the display area Ad not overlapping with the fingerprint detection area Fd but are not disposed in the fingerprint detection area Fd.

As described above, in the fingerprint detection area Fd, touch detection can be performed using the fingerprint sensor 10, and accordingly, the second detection electrodes TDL may not be arranged at positions overlapping with the fingerprint sensor 10. By configuring as such, in a case where a finger or the like is brought into contact with or approaching the fingerprint detection area Fd, a detection signal Vdet is output from the fingerprint sensor 10, and a detection signal VdetA is not output from the touch sensor 50. Accordingly, the load of the calculation process in the touch detector 40A can be decreased.

In addition, since each drive electrode 33A also has a function as a common electrode at the time of performing a display operation, as illustrated in FIG. 35, the drive electrodes 33A are disposed in the whole display area Ad including the fingerprint detection area Fd.

(Second Modification)

Figure 36:
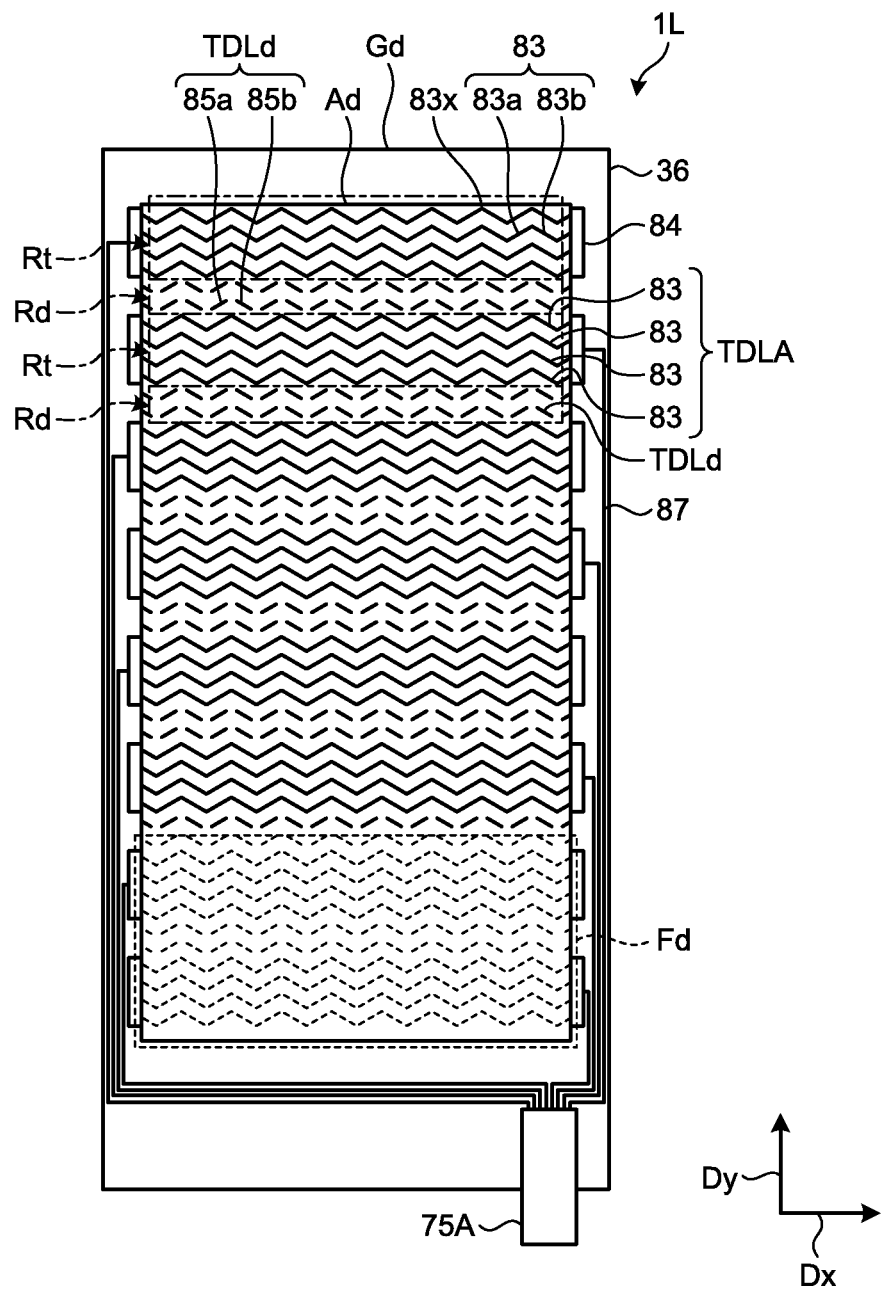
FIG. 36 is a schematic plan view of a display unit provided with a detection function according to a second modification of the tenth embodiment.

In FIGS. 33 and 35, while the configuration in which a plurality of band-shaped second detection electrodes TDL are arranged is illustrated, the configuration is not limited thereto. FIG. 36 is a schematic plan view of a display unit provided with a detection function according to a second modification of the tenth embodiment. FIG. 36 illustrates only the plan view of a second substrate 36, and drive electrodes 33A disposed on a first substrate 31 are not illustrated, also in this modification, the drive electrode 33A may have a configuration similar to that of the example illustrated in FIGS. 33 and 35.

As illustrated in FIG. 36, in a display area Ad of the second substrate 36, second detection electrodes TDLA functioning as detection electrodes of the touch sensor 50 and dummy electrodes TDLd not functioning as detection electrodes are disposed. A detection electrode area Rt in which the second detection electrodes TDLA are disposed and a dummy electrode area Rd in which the dummy electrodes TDLd are disposed are alternately arranged in the second direction Dy.

Each of the second detection electrodes TDLA includes a plurality of metal wirings 83. Each metal wiring 83 has a configuration in which a thin wire piece 83a and a thin wire piece 83b are alternately coupled to a coupling part 83x. The thin wire piece 83a and the thin wire piece 83b incline in opposite directions with respect to the first direction Dx. Each of the metal wirings 83 is formed in a zigzag line or a broken line, and the metal wirings 83 are disposed along the first direction Dx as a whole. A plurality of the metal wirings 83 are arranged with a gap arranged therebetween in the second direction Dy. End portions of the plurality of the metal wirings 83 that are arranged are coupled using a pad part 84 and functions as one second detection electrode TDLA.

Each of the second detection electrodes TDLA has a band shape along the first direction Dx as a whole, and a plurality of the second detection electrodes TDLA are arranged in the second direction Dy. Each of the second detection electrodes TDLA is coupled to a flexible substrate 75A disposed on the side of the short side of the frame area Gd of the second substrate 36 through the pad part 84 and a frame wiring 87.

Each of the dummy electrodes TDLd includes a thin wire piece 85a and a thin wire piece 85b. The thin wire piece 85a is disposed along the thin wire piece 83a of the metal wiring 83, and the thin wire piece 85b is disposed along the thin wire piece 83b of the metal wiring 83. The thin wire piece 85a and the thin wire piece 85b are alternately arranged with a gap interposed therebetween in the first direction Dx, and a plurality of the thin wire pieces 85a and 85b are arranged in the second direction Dy.

The dummy electrode TDLd is arranged between the second detection electrodes TDLA arranged in the second direction Dy. The dummy electrode TDLd is arranged to have a gap from the second detection electrode TDLA and is in a floating state in which a voltage signal is not supplied, and the electric potential is not fixed at the time of performing touch detection.

Also in this modification, capacitance is generated at an intersection between the second detection electrode TDLA and the drive electrode 33A, and touch detection can be performed based on the basic principle of touch detection of the mutual capacitance type described above. The lines Em of electric force of the fringe electric field described above pass through the dummy electrode area Rd and arrive up to a further upper side than the first face 101a of the cover member 101.

The metal wiring 83 configuring the second detection electrode TDLA is formed using at least one metal material of aluminum (Al), copper (Cu), silver (Ag), and molybdenum (Mo) and an alloy thereof. In addition, the metal wiring 83 may be a stacked body in which a plurality of layers are stacked using one or more such metal materials. At least one metal material of aluminum (Al), copper (Cu), silver (Ag), and molybdenum (Mo) and an alloy thereof has resistance lower than a transparent conductive oxide such as an ITO. In addition, compared to a transparent conductive oxide such as the ITO, such a metal material has a light shielding property, and there is a possibility that the transmittance is lowered, or the pattern of the second detection electrode TDLA is visually recognized. In this embodiment, one second detection electrode TDLA has a plurality of narrow metal wirings 83, and the metal wirings 83 are formed in zigzag lines or broken lines and are arranged with a gap larger than the wire width interposed therebetween, whereby low resistance and non-visibility can be realized. As a result, the resistance of the second detection electrode TDLA is low, and a display device 1L can be configured to be a thin type and have a large screen or have high definition.

It is preferable that the material of the thin wire piece 85a and the thin wire piece 85b configuring the dummy electrode TDLd is the same as the metal material of the metal wiring 83. In such a case, a difference in the light transmittance between the detection electrode area Rt and the dummy electrode area Rd is suppressed, and the non-visibility of the second detection electrodes TDLA and the dummy electrodes TDLd can be realized. In addition, in order to suppress the reflectivity, it is preferable to perform a blackening process for the uppermost surfaces of the metal wirings 83, the thin wire pieces 85a and the thin wire pieces 85b.

Also in this modification, the fingerprint sensor 10 is disposed to overlap with the fingerprint detection area Fd. The touch sensor 50 performs touch detection in accordance with a change in the capacitance between the second detection electrode TDLA and the drive electrode 33A for an area of the display area Ad that does not overlap with the fingerprint detection area Fd. In addition, the fingerprint sensor 10 performs touch detection in accordance with a change in the capacitance of the first detection electrode 25 for the fingerprint detection area Fd. In this way, touch detection for the whole face of the display area Ad can be performed.

In this modification, since the second detection electrode TDLA is configured by the metal wiring 83, the light transmittance is different between the area in which the second detection electrode TDLA is disposed and the area in which the second detection electrode TDLA is not disposed, and as a result, there is a possibility that the areas are visually recognized by an observer. For this reason, it is preferable to arrange the second detection electrode TDLA in the fingerprint detection area Fd. Alternatively, the dummy electrode TDLd using the same metal material may be disposed in the fingerprint detection area Fd without arranging the second detection electrode TDLA in the fingerprint detection area Fd. In this way, the non-visibility of the second detection electrode TDLA and the dummy electrode TDLd for the whole face of the display area Ad can be realized.

Eleventh Embodiment

Figure 37:
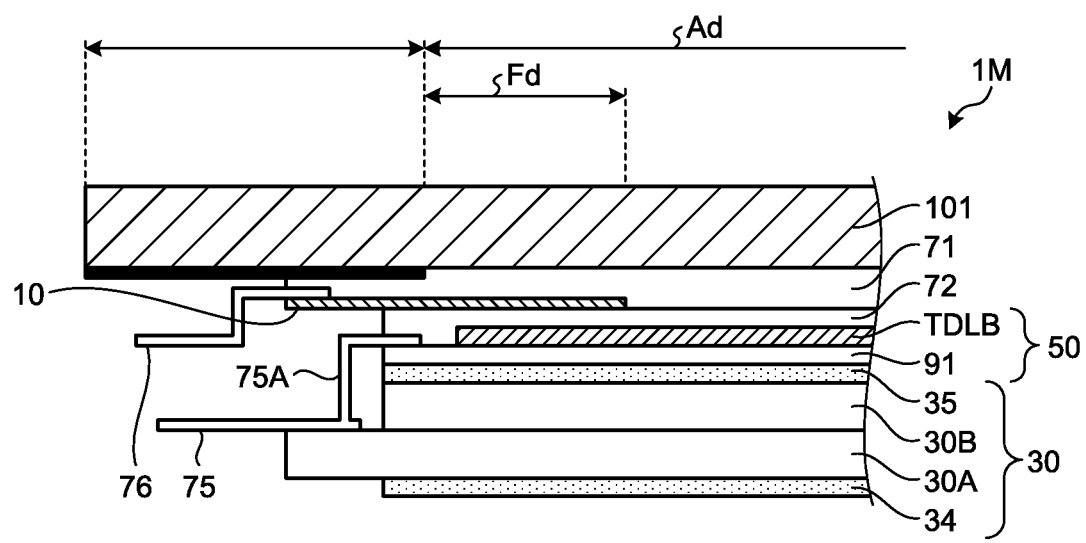
FIG. 37 is a cross-sectional view that illustrates a schematic cross-section structure of a display device according to an eleventh embodiment.

FIG. 37 is a cross-sectional view that illustrates a schematic cross-section structure of a display device according to an eleventh embodiment. In the display devices 1J, 1K, and 1L illustrated in FIGS. 28 to 36, the drive electrode 33A functions as a common electrode in a display operation and functions as a drive electrode in a detection operation. In other words, the display devices 1J, 1K, and 1L are devices in which the display panel 30 and the touch sensor 50 are integrated together. However, the configuration is not limited thereto, but a touch sensor 50 may be disposed on the display panel 30.

As illustrated in FIG. 37, in the display device 1M, a touch sensor 50 is disposed on a polarizing plate 35 of a display panel 30. The touch sensor 50 includes a sensor base 91 and a second detection electrode TDLB disposed in the sensor base 91. A flexible substrate 75A is coupled to the sensor base 91, and a detection signal VdetA of the second detection electrode TDLB is taken out to the outside.

As illustrated in FIG. 37, the touch sensor 50 is bonded to a fingerprint sensor 10 via an adhesive layer 72. In addition, the fingerprint sensor 10 is bonded to a cover member 101 via the adhesive layer 71. The touch sensor 50, in an area of the display area Ad that does not overlap with the fingerprint detection area Fd, is bonded to the cover member 101 via an adhesive layer 71 and an adhesive layer 72.

In this embodiment, the touch sensor 50 is disposed on the whole face of the display area Ad and is arranged to overlap with the fingerprint sensor 10 in a fingerprint detection area Fd. There is a possibility that the touch detection sensitivity of the touch sensor 50 is lowered in a portion overlapping with the fingerprint sensor 10. For this reason, also in this embodiment, a detection controller 11A (see FIG. 28) performs a touch detecting operation of the touch sensor 50 for an area of the display area Ad that does not overlap with the fingerprint detection area Fd and performs a touch detecting operation of the fingerprint sensor 10 for the fingerprint detection area Fd. In this way, the touch detection for the whole face of the display area Ad can be performed. In this way, the fingerprint sensor 10 can perform touch detection to complement the touch detecting operation of the touch sensor 50.

In this embodiment, the configuration of the touch sensor 50 can be appropriately selected. For example, the touch sensor 50 may have a configuration, in which a plurality of second detection electrodes TDLB are arranged in a matrix pattern, performing touch detection of the self-capacitance type. Alternatively, the touch sensor 50 may have a configuration, in which second detection electrodes TDLB and drive electrodes are arranged parallel with each other, performing touch detection of the mutual capacitance type.

While the preferred embodiments of the present invention have been described, the present invention is not limited to such embodiments. Contents disclosed in the embodiments are merely examples, and various changes can be made in a range not departing from the concept of the present invention. An appropriate change made in the range not departing from the concept of the present invention apparently belongs to the technical scope of the present invention. In a range not departing from the concept of each of the embodiments and each of the modifications described above, at least one of various omissions, substitutions, and changes can be made.

What is claimed is:

1. A display device comprising:
a display panel that includes a display function layer displaying an image in a display area;
a cover member that includes a first face and a second face disposed on an opposite side of the first face and faces the display panel; and
a fingerprint sensor that includes a plurality of first detection electrodes disposed in a sensor base and configured to detect unevenness of an object brought into contact with or approaching the first face of the cover member, a shield electrode disposed to face the plurality of first detection electrodes and configured to suppress a change in capacitance between the first detection electrodes and the shield electrode, and switching elements disposed in correspondence with the first detection electrodes, the fingerprint sensor being arranged between the cover member and the display panel and arranged to overlap with the display area when viewed in a direction perpendicular to the first face.

2. The display device according to claim 1, further comprising a drive circuit configured to supply a drive signal to the first detection electrodes through the switching elements, wherein each of the first detection electrodes outputs a detection signal according to a change in capacitance between the object and the first detection electrode.

3. The display device according to claim 2, wherein the drive circuit is disposed at a position of the sensor base that overlaps with a frame area disposed on an outer side of the display area.

4. The display device according to claim 2, wherein the drive circuit supplies a guard signal configured to suppress a change in the capacitance between the shield electrode and the first detection electrodes to the shield electrode.

5. The display device according to claim 1, wherein the fingerprint sensor is bonded to the second face of the cover member through a resin layer having a light transmitting property.

6. The display device according to claim 1, wherein the fingerprint sensor is bonded to the display panel through a resin layer having a light transmitting property.

7. The display device according to claim 1,
wherein a concave part that is concaved toward the second face is disposed on the first face of the cover member, and
the fingerprint sensor faces the second face of the cover member and is arranged at a position overlapping with the concave part.

8. The display device according to claim 1,
wherein a concave part that is concaved toward the first face is disposed on the second face of the cover member, and
the fingerprint sensor is arranged inside the concave part.

9. The display device according to claim 1, further comprising a support substrate that faces the fingerprint sensor and is disposed on an opposite side of the cover member, wherein the fingerprint sensor is arranged to be interposed between the cover member and the support substrate.

10. The display device according to claim 1, wherein at least one of a gate line and a signal line coupled to the switching element inclines with respect to an arrangement direction of pixels of the display panel.

11. The display device according to claim 1, wherein a direction in which a plurality of the switching elements are arranged inclines with respect to an arrangement direction of pixels of the display panel.

12. The display device according to claim 1, wherein the fingerprint sensor is disposed to overlap with a part of the display area.

13. The display device according to claim 12, wherein the first detection electrodes are disposed at approximate center of one side of the display area.

14. The display device according to claim 1, wherein the fingerprint sensor is disposed to overlap with the whole face of the display area.

15. The display device according to claim 1, further comprising a plurality of second detection electrodes disposed at positions located farther from the second face than the fingerprint sensor in a direction perpendicular to the second face of the cover member and configured to detect a position of a finger brought into contact with or approaching the first face of the cover member.

16. The display device according to claim 15,
wherein the display panel includes a drive electrode to which a display drive signal that is common electric potential for the pixels is supplied, and
the second detection electrodes face the drive electrode and output a detection signal according to a change in capacitance between the second detection electrodes and the drive electrode.

17. The display device according to claim 15,
wherein the fingerprint sensor is disposed to overlap with a part of the display area, and the second detection electrodes are disposed at positions not overlapping with the fingerprint sensor in the display area, and
a position of an external object brought into contact with or approaching the display area is detected based on a detection signal output from the second detection electrodes and a detection signal output from the first detection electrodes.

* * * * *